US009432815B2

(12) United States Patent
Edge

(10) Patent No.: US 9,432,815 B2
(45) Date of Patent: Aug. 30, 2016

(54) LOCATION SUPPORT USING A DEVICE IDENTIFICATION CONVEYED BY A POSITIONING PROTOCOL

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/722,807

(22) Filed: May 27, 2015

(65) Prior Publication Data

US 2015/0350850 A1 Dec. 3, 2015

Related U.S. Application Data

(60) Provisional application No. 62/003,481, filed on May 27, 2014.

(51) Int. Cl.

| | |
|---|---|
| *H04W 24/00* | (2009.01) |
| *H04W 4/04* | (2009.01) |
| *H04W 88/02* | (2009.01) |
| *G01S 5/00* | (2006.01) |
| *G01S 5/02* | (2010.01) |

(52) U.S. Cl.
CPC .............. *H04W 4/04* (2013.01); *G01S 5/0018* (2013.01); *G01S 5/021* (2013.01); *G01S 5/0236* (2013.01); *H04W 88/02* (2013.01); *G01S 5/0252* (2013.01)

(58) Field of Classification Search
CPC ..... H04W 4/02; H04W 64/00; H04W 4/025; H04W 4/021; H04W 64/003; H04L 67/18

USPC ...................................................... 455/456.1
See application file for complete search history.

(56) References Cited

U.S. PATENT DOCUMENTS

| 6,223,028 B1 | 4/2001 | Chang et al. |
| 6,795,704 B1 | 9/2004 | Hardin |
| 2005/0128956 A1 | 6/2005 | Hsu et al. |

(Continued)

FOREIGN PATENT DOCUMENTS

| EP | 2180664 A1 | 4/2010 |
| WO | WO-2007102040 A1 | 9/2007 |
| WO | WO-2011099909 A1 | 8/2011 |

OTHER PUBLICATIONS

International Search Report and Written Opinion—PCT/US2015/032691—ISA/EPO—Sep. 15, 2015.

*Primary Examiner* — Don N Vo
(74) *Attorney, Agent, or Firm* — Kilpatrick Townsend & Stockton LLP

(57) ABSTRACT

Techniques for using device-related information for positioning of a mobile device include providing non-unique device-related information by a mobile device to a location server. Such device-related information can be conveyed from a mobile device to a server in positioning protocols. The device related information may comprise information about an Original Equipment Manufacturer (OEM) for a mobile device, a model, a version and information about wireless chip OEMs, models and versions and may enable a positioning characteristic for the mobile device to be retrieved from stored data to support positioning of the mobile device. Techniques can also include a location server gathering information regarding a positioning characteristic for a mobile device and storing this information in association with the mobile device type which may reduce or avoid the need to configure stored data.

28 Claims, 6 Drawing Sheets

(56) References Cited

U.S. PATENT DOCUMENTS

| | | | | |
|---|---|---|---|---|
| 2008/0070495 A1* | 3/2008 | Stricklen | ............ | H04W 8/22 455/3.01 |
| 2009/0253440 A1 | 10/2009 | Edge | | |
| 2010/0331013 A1* | 12/2010 | Zhang | ............ | G01S 5/0242 455/456.2 |
| 2012/0082091 A1* | 4/2012 | Siomina | ............ | H04W 4/02 370/328 |
| 2013/0203373 A1* | 8/2013 | Edge | ............ | H04W 4/22 455/404.2 |
| 2013/0317944 A1* | 11/2013 | Huang | ............ | G01S 5/0252 705/26.61 |

* cited by examiner

LOCATION SUPPORT USING A DEVICE IDENTIFICATION CONVEYED BY A POSITIONING PROTOCOL

CROSS-REFERENCE TO RELATED APPLICATIONS

This application claims the benefit of U.S. Provisional Patent Application Ser. No. 62/003,481, entitled "IDENTIFICATION OF A DEVICE USING A POSITIONING PROTOCOL," filed on May 27, 2014, which is assigned to the assignee hereof and incorporated herein by reference for all purposes.

BACKGROUND

New mobile devices, such as mobile phones, smartphones and tablets appear on the market regularly. Additionally new versions of existing mobile devices are also frequently released (e.g. having new or updated hardware and/or software). These new mobile device models and versions can be expected to have certain characteristics and capabilities in terms of their ability to perform location related measurements. Obtaining location related measurements by a mobile device and computing a location of a mobile device either by the mobile device or at another entity such as a location server may be important or even critical to some applications and services such as navigation, direction finding and emergency calls. The characteristics and capabilities of a mobile device related to positioning support may include the accuracy of the different measurements and certain limitations and possible faults. In addition, some measurements like received signal strength indication (RSSI), signal round trip propagation time (RTT), signal-to-noise ratio (S/N) and inter-frequency Reference Signal Time Difference (RSTD) may require recalibration to accurately address measurement errors and measurement differences for different mobile device models.

The ability to provide an international mobile station equipment identity (IMEI) or electronic serial number (ESN) to a location server was added to some control plane (CP) location standards such as CP location solutions defined by the $3^{rd}$ Generation Partnership Project (3GPP). This can enable a location server to infer certain aspects of a mobile device, such as a model and vendor, from these identifiers. This may enable a location server to infer certain positioning characteristics of a mobile device and thereby assist in the positioning of the mobile device. However, this approach is limited because it may not address different versions of the same phone model, and it depends on being able to preconfigure a database at, or accessible to, the location server to enable the location server to derive such information from mobile device identifiers. In such configurations, the location server may not be able to adapt positioning method support and/or other services to new mobile devices with identifiers the database or location server is not yet configured to support.

SUMMARY

Techniques disclosed herein include providing additional non-unique device-related information (e.g. vendor, model and version for a mobile device and/or one or more wireless chipsets in the mobile device) by a target mobile device to a location server. Such device-related information can be conveyed from a target mobile device to a server in a positioning protocol. These techniques can allow the location server to adapt much more efficiently to a particular mobile device type. Additionally, the techniques disclosed herein further enable location servers to gather information regarding new mobile device types and adapt automatically without the need to rely on a preconfigured database.

An example method of using device-related information for positioning of a first mobile device, according to the disclosure, comprises obtaining, from the first mobile device, non-unique device-related information regarding the first mobile device in a message, using a positioning protocol, the non-unique device-related information including information indicative of hardware and/or software features of the first mobile device, and determining, with a processing unit, a positioning characteristic for the first mobile device. The positioning characteristic for the first mobile device is determined based at least in part on stored information associated with the non-unique device-related information. The method further comprises using the positioning characteristic for the first mobile device to provide location support to the first mobile device.

The example method can include one or more of the following features. The non-unique device-related information may comprise information indicative of an Original Equipment Manufacturer (OEM) vendor, an OEM model, an OEM model version, a chip vendor, a chip model, a chip model version ID, a software or firmware release version, or any combination thereof. The location support may comprise at least one of providing particular assistance data to the first mobile device using the positioning protocol, requesting particular location information from the first mobile device using the positioning protocol, or computing a location estimate for the first mobile device using location information received from the first mobile device using the positioning protocol. The particular assistance data may comprise a radio frequency (RF) heat map of an area, the RF heat map having one or more positioning values for each of a plurality of locations in the area. The positioning characteristic for the first mobile device can comprise an inter-frequency bias for Observed Time Difference Of Arrival (OTDOA) position method for Long Term Evolution (LTE), a bias between pseudorange measurements for different GNSS systems that employ different carrier frequencies, an additional delay for signal round trip propagation time (RTT) measurements for wireless local area network (WLAN) access points (APs), an accuracy of position measurements, an internal delay in obtaining position measurements, or a functional modification of positioning measurements according to a fixed mathematical function with fixed parameters (e.g. fixed coefficients). The method may further comprise obtaining, from a second mobile device and using the positioning protocol, non-unique device-related information regarding the second mobile device, the non-unique device-related information for the second mobile device being the same as or partly the same as the non-unique device-related information for the first mobile device, receiving location information from the second mobile device using the positioning protocol, extracting, from the location information received from the second mobile device, a positioning characteristic for the second mobile device, and combining the positioning characteristic for the second mobile device with at least part of the stored information associated with the non-unique device-related information. The positioning characteristic for the first mobile device may be determined at least in part based on the positioning characteristic for the second mobile device. The positioning protocol can comprise Long Term Evolution (LTE) Positioning Protocol (LPP) or LPP Extensions (LPPe). The method can further comprise communicating a request for the non-unique device-related information to the first mobile device using the positioning protocol.

An example method of using device-related information for positioning of a mobile device comprises sending, from the mobile device to a server, non-unique device-related information regarding the mobile device in a message, using a positioning protocol, the non-unique device-related information including information indicative of hardware and/or software features of the mobile device, and receiving location support for the mobile device in accordance with the positioning protocol. The location support is based at least in part on the non-unique device-related information.

The example method can include one or more of the following features. The non-unique device-related information may comprise information indicative of of an Original Equipment Manufacturer (OEM) vendor, an OEM model, an OEM model version, a chip vendor, a chip model, a chip model version ID, a software or firmware release version, or any combination thereof. The location support may comprise at least one of receiving particular assistance data from the server using the positioning protocol, receiving a request for particular location information from the server using the positioning protocol, or determining a location estimate for the mobile device by the server based on location information sent by the mobile device using the positioning protocol. The particular assistance data may comprise a radio frequency (RF) heat map of an area, the RF heat map having one or more positioning values for each of a plurality of locations in the area. The method may further comprise receiving information regarding a reference device corresponding to the RF heat map, and adjusting the one or more positioning values for at least one location in the plurality of locations in the area based on the information regarding the reference device. The positioning protocol may comprise Long Term Evolution (LTE) Positioning Protocol (LPP) or LPP Extensions (LPPe). The non-unique device-related information regarding the mobile device may be sent using the positioning protocol in response to a request received, by the mobile device from the server, for the non-unique device-related information regarding the mobile device.

According to the disclosure, an example server comprises a communications interface, a memory, and a processing unit communicatively coupled with the communications interface and the memory. The processing unit is configured to cause the server to obtain, from a first mobile device via the communications interface, non-unique device-related information regarding the first mobile device in a message, using a positioning protocol, the non-unique device-related information including information indicative of hardware and/or software features of the first mobile device, and determine a positioning characteristic for the first mobile device. The positioning characteristic for the first mobile device is determined based at least in part on stored information associated with the non-unique device-related information. The processing unit is also configured to cause the server to use the positioning characteristic for the first mobile device to provide location support to the first mobile device via the communications interface.

The example server can include one or more of the following features. The processing unit can be configured to cause the server to provide the location support by: providing particular assistance data to the first mobile device using the positioning protocol, requesting particular location information from the first mobile device using the positioning protocol, computing a location estimate for the first mobile device using location information received from the first mobile device using the positioning protocol, or any combination thereof. The processing unit can be configured to cause the server to provide the particular assistance data, the particular assistance data comprising a radio frequency (RF) heat map of an area, the RF heat map having one or more positioning values for each of a plurality of locations in the area. The processing unit can be configured to cause the server to use the positioning characteristic for the first mobile device by using one or more of an inter-frequency bias for the Observed Time Difference Of Arrival (OTDOA) position method for Long Term Evolution (LTE), a bias between pseudorange measurements for different GNSS systems that employ different carrier frequencies, an additional delay for signal round trip propagation time (RTT) measurements for wireless local area network (WLAN) access points (APs), an accuracy of position measurements, an internal delay in obtaining position measurements, or a functional modification of positioning measurements according to a fixed mathematical function with fixed parameters (e.g. fixed coefficients). The processing unit can be configured to cause the server to obtain, from a second mobile device and using the positioning protocol via the communications interface, non-unique device-related information regarding the second mobile device, the non-unique device-related information for the second mobile device being the same as or partly the same as the non-unique device-related information for the first mobile device, receive location information from the second mobile device using the positioning protocol, extract, from the location information received from the second mobile device, a positioning characteristic for the second mobile device, and combine the positioning characteristic for the second mobile device with at least part of the stored information associated with the non-unique device-related information. The processing unit can be configured to cause the server to determine the positioning characteristic for the first mobile device based, at least in part, on the positioning characteristic for the second mobile device. The processing unit can be configured to cause the server to obtain the non-unique device-related information regarding the first mobile device using Long Term Evolution (LTE) Positioning Protocol (LPP) or LPP Extensions (LPPe). The processing unit can be configured to cause the server to communicate a request for the non-unique device-related information to the first mobile device using the positioning protocol.

According to the disclosure a mobile device comprises a communications interface, a memory, and a processing unit communicatively coupled with the communications interface and the memory, the processing unit configured to cause the mobile device to: send, via the communications interface to a server, non-unique device-related information regarding the mobile device in a message, using a positioning protocol, the non-unique device-related information including information indicative of hardware and/or software features of the mobile device, and receive location support for the mobile device in accordance with the positioning protocol. The location support is based at least in part on the non-unique device-related information.

The example mobile device can include one or more of the following features. The processing unit can be configured to cause the mobile device to receive the location support by: receiving particular assistance data from the server using the positioning protocol, receiving a request for particular location information from the server using the positioning protocol, sending location information to the server using the positioning protocol to enable a location estimate for the mobile device at the server based on the location information sent by the mobile device, or any combination thereof. The processing unit can be configured to cause the mobile device to utilize the particular assistance data, wherein the particular assistance data comprises a radio frequency (RF) heat map of an area, the RF heat map having one or more positioning values for each of a plurality of locations in the area. The processing unit can be configured to cause the mobile device to receive information regarding a reference device corresponding to the RF heat map, and adjust the one or more positioning values for at least one location in the plurality of locations in the area based on the information regarding the reference device. The processing unit can be configured to cause the mobile device to send the non-unique device-related information regarding the mobile device using Long Term Evolution (LTE) Positioning Protocol (LPP) or LPP Extensions (LPPe). The processing unit can be configured to cause the mobile device to send the non-unique device-related information regarding the mobile device in response to a request received, via the communications interface from the server, for the non-unique device-related information regarding the mobile device.

An example apparatus, according to the disclosure, can include means for obtaining, from the first mobile device, non-unique device-related information regarding the first mobile device in a message, using a positioning protocol, the non-unique device-related information including information indicative of hardware and/or software features of the first mobile device, means for determining, with a processing unit, a positioning characteristic for the first mobile device. The positioning characteristic is determined based at least in part on stored information associated with the non-unique device-related information. The example apparatus further includes means for using the positioning characteristic to provide location support to the first mobile device.

The example apparatus can further include one or more of the following features. The means for using the positioning characteristic to provide location support may include means for: providing particular assistance data to the first mobile device using the positioning protocol, requesting particular location information from the first mobile device using the positioning protocol, computing a location estimate for the first mobile device using location information received from the first mobile device using the positioning protocol, or any combination thereof. The means for providing particular assistance data can comprise means for providing a radio frequency (RF) heat map of an area, the RF heat map having one or more positioning values for each of a plurality of locations in the area. Means for using the positioning characteristic may comprise means for using at least one of an inter-frequency bias for the Observed Time Difference Of Arrival (OTDOA) position method for Long Term Evolution (LTE), a bias between pseudorange measurements for different GNSS systems that employ different carrier frequencies, an additional delay for signal round trip propagation time (RTT) measurements for wireless local area network (WLAN) access points (APs), an accuracy of position measurements, an internal delay in obtaining position measurements, or a functional modification of positioning measurements according to a fixed mathematical function with fixed parameters (e.g. fixed coefficients). The apparatus can further comprise means for obtaining, from a second mobile device and using the positioning protocol, non-unique device-related information regarding the second mobile device, the non-unique device-related information for the second mobile device being the same as or partly the same as the non-unique device-related information for the first mobile device, means for receiving location information from the second mobile device using the positioning protocol, means for extracting, from the location information received from the second mobile device, a positioning characteristic for the second mobile device, and means for combining the positioning characteristic for the second mobile device with at least part of the stored information associated with the non-unique device-related information. Means for determining the positioning characteristic for the first mobile device may make the determination based at least in part on the positioning characteristic for the second mobile device. The apparatus may further comprise means for sending the non-unique device-related information regarding the mobile device using Long Term Evolution (LTE) Positioning Protocol (LPP) or LPP Extensions (LPPe). The apparatus may further comprise means for communicating a request for the non-unique device-related information to the first mobile device using the positioning protocol.

Another example apparatus, according to the disclosure can comprise means for sending, from the apparatus to a server, non-unique device-related information regarding the apparatus in a message, using a positioning protocol, the non-unique device-related information including information indicative of hardware and/or software features of the apparatus, and means for receiving location support for the apparatus in accordance with the positioning protocol. The location support is based at least in part on the non-unique device-related information.

The example apparatus can include one or more of the following features. Means for receiving location support can comprise means for performing at least one of receiving particular assistance data from the server using the positioning protocol, receiving a request for particular location information from the server using the positioning protocol, or receiving a location estimate for the apparatus from the server based on location information sent by the apparatus using the positioning protocol. The apparatus can include means for utilizing the particular assistance data, where the particular assistance data comprises a radio frequency (RF) heat map of an area, the RF heat map having one or more positioning values for each of a plurality of locations in the area. The apparatus can further comprise means for receiving information regarding a reference device corresponding to the RF heat map, and means for adjusting the one or more positioning values for at least one location in the plurality of locations in the area based on the information regarding the reference device. The apparatus can comprise means for sending the non-unique device-related information regarding the mobile device using a positioning protocol that comprises Long Term Evolution (LTE) Positioning Protocol (LPP) or LPP Extensions (LPPe). The apparatus can comprise means for sending the non-unique device-related information regarding the mobile device in response to a request received, via the communications interface from the server, for the non-unique device-related information regarding the mobile device An example computer-readable medium, according to the disclosure, can comprise instructions embedded thereon for using device-related information for positioning of a first mobile device. The instructions can include computer code for obtaining, from the first mobile device, non-unique device-related information regarding the first mobile device in a message, using a positioning protocol, the non-unique device-related information including information indicative of hardware and/or software features of the first mobile device, means for determining, with a processing unit, a positioning characteristic for the first mobile device. The positioning characteristic is determined based at least in part on stored information associated with the non-unique device-related information. The instructions can further include computer code for using the positioning characteristic to provide location support to the first mobile device.

The example computer-readable medium can further include computer code for implementing one or more of the following features. The computer code for using the positioning characteristic to provide location support can include computer code for: providing particular assistance data to the first mobile device using the positioning protocol, requesting particular location information from the first mobile device using the positioning protocol, computing a location estimate for the first mobile device using location information received from the first mobile device using the positioning protocol, or any combination thereof. The computer code for providing particular assistance data can comprise computer code for providing a radio frequency (RF) heat map of an area, the RF heat map having one or more positioning values for each of a plurality of locations in the area. Computer code for using the positioning characteristic can comprise computer code for using at least one of an inter-frequency bias for the Observed Time Difference Of Arrival (OTDOA) position method for Long Term Evolution (LTE), a bias between pseudorange measurements for different GNSS systems that employ different carrier frequencies, an additional delay for signal round trip propagation time (RTT) measurements for wireless local area network (WLAN) access points (APs), an accuracy of position measurements, an internal delay in obtaining position measurements, or a functional modification of positioning measurements according to a fixed mathematical function with fixed parameters (e.g. fixed coefficients). The instructions can further comprise computer code for obtaining, from a second mobile device and using the positioning protocol, non-unique device-related information regarding the second mobile device, the non-unique device-related information for the second mobile device being the same as or partly the same as the non-unique device-related information for the first mobile device, computer code for receiving location information from the second mobile device using the positioning protocol, computer code for extracting, from the location information received from the second mobile device, a positioning characteristic for the second mobile device, and computer code for combining the positioning characteristic for the second mobile device with at least part of the stored information associated with the non-unique device-related information. Computer code for determining the positioning characteristic for the first mobile device may make the determination based at least in part on the positioning characteristic for the second mobile device. The instructions may further comprise computer code for sending the non-unique device-related information regarding the mobile device using the Long Term Evolution (LTE) Positioning Protocol (LPP) or LPP Extensions (LPPe). The instructions may further comprise computer code for communicating a request for the non-unique device-related information to the first mobile device using the positioning protocol.

Another example computer-readable medium, according to the disclosure, can comprise instructions embedded thereon for using device-related information for positioning of a mobile device. The instructions can include computer code for sending, from the mobile device to a server, non-unique device-related information regarding the mobile device in a message, using a positioning protocol, the non-unique device-related information including information indicative of hardware and/or software features of the mobile device, and computer code for receiving location support for the mobile device in accordance with the positioning protocol. The location support is based at least in part on the non-unique device-related information.

The example computer-readable medium can further include computer code for implementing one or more of the following features. The instructions can include computer code for receiving location support and can comprise computer code for performing at least one of receiving particular assistance data from the server using the positioning protocol, receiving a request for particular location information from the server using the positioning protocol, or receiving a location estimate for the mobile device from the server based on location information sent by the mobile device using the positioning protocol. The instructions can include computer code for utilizing the particular assistance data, where the particular assistance data comprises a radio frequency (RF) heat map of an area, the RF heat map having one or more positioning values for each of a plurality of locations in the area. The instructions can include computer code for receiving information regarding a reference device corresponding to the RF heat map, and computer code for adjusting the one or more positioning values for at least one location in the plurality of locations in the area based on the information regarding the reference device. The instructions can include computer code for sending the non-unique device-related information regarding the mobile device using a positioning protocol that comprises Long Term Evolution (LTE) Positioning Protocol (LPP) or LPP Extensions (LPPe). The instructions can include computer code for sending the non-unique device-related information regarding the mobile device in response to a request received, via the communications interface from the server, for the non-unique device-related information regarding the mobile device.

Items and/or techniques described herein may provide one or more of the following capabilities, as well as other capabilities not mentioned. Techniques can provide for a location server to efficiently adapt to a particular mobile device without the need to rely on a preconfigured database. These and other advantages and features are described in more detail in conjunction with the text below and attached figures.

BRIEF DESCRIPTION OF THE DRAWINGS

An understanding of the nature and advantages of various embodiments may be realized by reference to the following figures.

DETAILED DESCRIPTION

Figure 1:
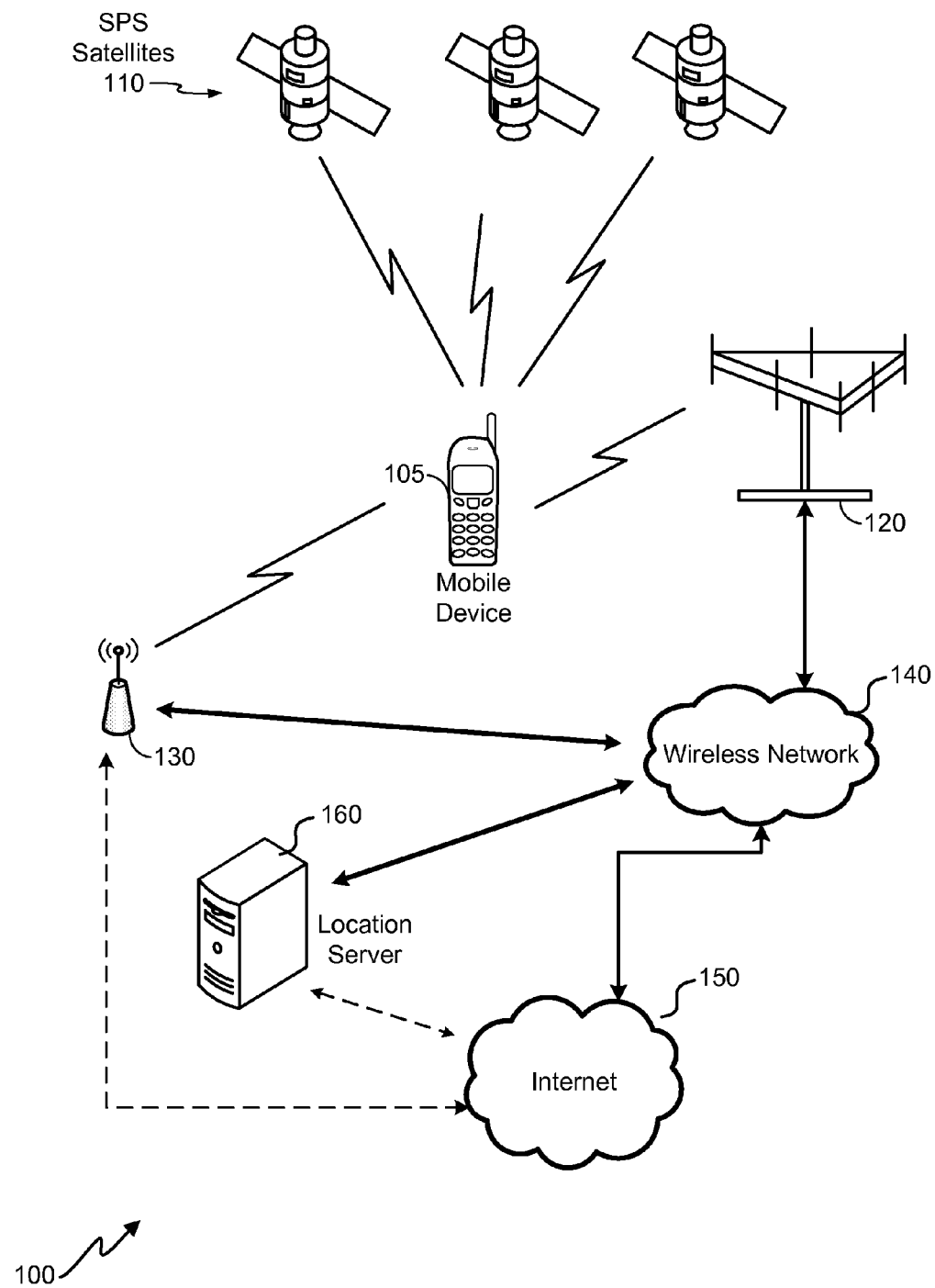
FIG. 1 is a simplified illustration of a positioning system capable of implementing positioning functions described herein, according to one embodiment.

Positioning for mobile devices such as mobile phones, smartphones, laptops tablets, portable media players, and the like, can be used for a variety of reasons to provide additional functionality to mobile devices. Such positioning can, for example, help a mobile device to be located in an emergency, enable a mobile device to provide navigational features to a user, and so on.

The term "positioning" as used herein is synonymous with the term "locating" and "location support" and refers to an ability to obtain the location (or a location estimate) of a mobile device or assist or enable the mobile device to obtain its own location at a current time and/or some later time. The term location may also be known as a position, location estimate, position estimate, location fix, position fix, fix or some other name and may refer to a geographical location of the mobile device (e.g. a latitude, longitude and possibly an altitude), a civic location (e.g. such as a postal address or name of a well known place) and/or a relative location (e.g. such as a set of distances East or West, North or South and above or below some already known reference location). A mobile device may also be known as a User Equipment (UE), a mobile station, mobile terminal, wireless terminal, wireless device, device, terminal, target mobile device, target device, target, Secure User Plane Location (SUPL) Enabled Terminal (SET) or by some other name.

Methods for enabling positioning can be implemented by the mobile device and/or by other devices in communication with the mobile device as part of a positioning system. A location server, for example, can be used to implement positioning methods for supporting the positioning of a mobile device. These positioning methods can include, for example, measurement by a mobile device of signals transmitted by: (i) satellite vehicles (SVs) belonging to a Global Navigation Satellite System (GNSS); (ii) base stations belonging to a wireless cellular network; and/or (iii) access points (APs), home base stations, small cells and/or Femtocells with short radio range (e.g. 100 meters or less) that may belong to a wireless local area network (WLAN). Measurements can be of signal time of arrival (TOA), Reference Signal Time Difference (RSTD) for Observed Time Difference Of Arrival (OTDOA) positioning method, signal strength (e.g. received signal strength indication (RSSI)), signal round trip propagation time (RTT) and/or other signal characteristics. The different signal measurements may be associated with different position methods. For example, with the Assisted GNSS (A-GNSS) position method, a location server may send GNSS related assistance data to a mobile device to assist the mobile device to make signal measurements of one or more GNSS systems (e.g. such as GPS, Glonass, Galileo, Beidou) after which the mobile device or the location server may compute a location estimate for the mobile device using the measurements. Similarly with the OTDOA position method, a mobile device may make RSTD measurements for signals transmitted from base stations and/or femtocells in a wireless network supporting the 3rd Generation Partnership Project (3GPP) Long Term Evolution (LTE) wireless technology after which the mobile device or the location server may compute the location of the mobile device using the measurements and known locations for the LTE base stations (known as eNodeBs) and/or LTE femtocells (known as Home eNodeBs or HeNBs) that were measured. Further, with a WLAN position method, a mobile device may measure RSSI and/or RTT for one or more APs supporting one of the IEEE 802.11 WLAN wireless technologies and/or one of the Bluetooth® short range node (SRN) technologies. The location server or mobile device may then compute the location of the mobile device using the WLAN RSSI and/or RTT measurements and (i) the known locations of the APs and/or (ii) radio frequency (RF) heat maps that provide the expected RSSI and/or expected RTT values that would be measured over a set of grid points (e.g. a rectangular array of grid points at 1 meter intervals covering say an area of 200 by 200 meters).

In cases where a location server computes the location of a mobile device, which is commonly known as User Equipment (UE) assisted mode, the mobile device may first transfer location related measurements to the location server. In cases where a mobile device computes the location, which is commonly known as UE based mode, a location server may first provide assistance data to the mobile device to assist with the location computation. Such assistance data may include: (i) satellite related data for A-GNSS such as orbital data, timing data, almanac data, expected Doppler and code phase shift; (ii) information about eNodeBs for OTDOA including eNodeB identities, supported frequencies and/or frequency bands, positioning reference signal (PRS) characteristics, locations and/or timing; and/or (iii) information about APs for WLAN positioning or SRN positioning including AP identities, locations, transmission characteristics (e.g. transmission power, antenna gain, transmission technology, transmission channels) and/or AP RF heat maps.

A location server can adapt the position methods that are used, including the assistance data that is sent to a mobile device and the location measurements that are requested from a mobile device, based on known information about the mobile device that may include information on certain positioning characteristics of the mobile device. For example, a mobile device may make measurements and send them to the location server, according to a given position method. When computing a location for the mobile device (e.g., in UE assisted mode), the location server may then adapt its treatment of the measurements to any known positioning characteristics of the mobile device, including any known faults, weaknesses, and/or strengths. This functionality may therefore be based on what is known about the mobile device.

Traditional techniques of conveying device information to a location server are limited in the type of information that can be conveyed. This can, in turn, limit the adaptability of the location server. For example, certain control plane (CP) location solutions defined by 3GPP (e.g. the CP location solution for LTE access or for other access types supported by 3GPP such as Global System for Mobile Communications (GSM) or Wide Band Code Division Multiple Access (WCDMA)) allow the International Mobile Equipment Identity (IMEI) of a target mobile device to be provided to the location server by the network. While information regarding the vendor and possibly the model of the mobile device may be obtained in some cases using the IMEI (e.g., by using a database, index, or key to determine that certain values of the IMEI correspond to certain vendors), information concerning which wireless chipsets are used in the mobile device (e.g. to support a modem or WiFi function) or which version of a particular model of a mobile device is being used may typically not be capable of determination. Furthermore, the IMEI may typically not be available to a location server for user plane location solutions, such as the Secure User Plane Location (SUPL) solution defined by the Open Mobile Alliance (OMA). In addition, making use of an IMEI would typically require configuration of data in advance in a location server (e.g. configuration of vendor and model association with different parts of the IMEI and configuration of known characteristics for each vendor and/or each model). Such configured information would not typically be applicable to later models and versions of mobile devices and could also contain inaccurate or out of date data that might not be easy to correct or remove.

Embodiments described herein address these shortcomings by using techniques in which additional device-related information is provided by a target mobile device to one or more location servers. Such information can include information indicative of hardware and/or software features of the mobile device (which can be common among mobile devices of a particular device type), such as an Original Equipment Manufacturer (OEM) vendor identification (ID), an OEM model ID, an OEM model version ID, a software or firmware release version ID, and/or (e.g. for each chipset in the mobile device supporting a wireless interface) the chip vendor ID, chip vendor model ID and chip vendor model version ID. The identification (ID) for each piece of information (e.g. the OEM vendor, chip vendor, software or firmware release version) may be a name, a character string, a number or some other label that may be standardized and uniquely associated with the OEM or vendor or may be defined by each vendor and not standardized but assumed to be unique due to incorporating some unique aspect of the OEM or vendor (e.g. such as the business or trading name of the OEM or vendor). Such device-related information may be conveyed from a target mobile device to a server using a positioning protocol such as the LTE Positioning Protocol (LPP) defined by 3GPP in 3GPP Technical Specification (TS) 36.355, the LPP Extensions (LPPe) protocol defined by OMA (e.g. in OMA TS OMA-TS-LPPe-V2_0), IS-801 defined by the $3^{rd}$ Generation Partnership Project 2 (3GPP2), or some other positioning protocol. The LPPe protocol may be combined with the LPP protocol in some embodiments wherein one LPP messages embeds one LPPe message. In such a case, the combined protocol may be referred to as LPP/LPPe and may be used to convey device related information. In an embodiment, the device-related information may be conveyed as part of the positioning capabilities of the target device—e.g. may be added to the positioning capabilities defined for LPPe and conveyed using an LPPe or LPP/LPPe Provide Capabilities message. These techniques and embodiments can allow the location server to adapt much more efficiently to a particular mobile device. Additionally, the techniques disclosed herein further enable location servers to gather information regarding mobile device types and adapt automatically without the need to rely on a preconfigured database.

Further, these techniques allow a location server to provide device-related information to a target mobile device. For example, server provision of device-related information may be useful when the server provides an RF heat map to a target device that contains expected RSSI, RTT, and/or S/N values for a particular reference device, as described in more detail below. In this case, the server may also provide the device-related information to the target mobile device that is associated with the reference device.

FIG. 1 is a simplified illustration of a positioning system 100 capable of implementing the techniques described herein, according to one embodiment. The positioning system can include a mobile device 105, Satellite Positioning System (SPS) satellites 110, base station(s) 120, a wireless network 140, access point(s) 130, a location server 160, and the Internet 150. It should be noted that FIG. 1 provides only a generalized illustration of various components, any or all of which may be utilized as appropriate. Furthermore, components may be rearranged, combined, separated, substituted, duplicated and/or omitted, depending on desired functionality. A person of ordinary skill in the art will recognize many modifications to the components illustrated.

In the positioning system 100, a location of the mobile device 105 can be determined in any of a variety of ways, which may depend on a particular scenario or application. In some scenarios, for example, the location of the mobile device 105 can be calculated using trilateration, multilateration and/or other positioning techniques with information transmitted from SPS satellites 110. For example, the mobile device 105 can measure a pseudorange to each of a number of SVs for one or more GNSSs and then the mobile device or the location server 160 can compute a location for the mobile device 105 from the measured pseudoranges.

The base stations 120 may be eNodeBs that support LTE access in one embodiment. The access points 130 may be access points that support WiFi communication according to IEEE 802.11 standards, access points for an SRN technology like Bluetooth and/or femtocells or small cells that support LTE. The wireless network 140 may be a Wide Area Wireless Network (WWAN) and support LTE access, WCDMA access or GSM access or some other access type and may include some or all of the base stations 120 and/or access points 130. In an embodiment, the wireless network 140 may be a 3GPP Evolved Packet System (EPS). The location server 160 may be an enhanced serving mobile location center (E-SMLC) or a SUPL Location Platform (SLP) in some embodiments. The location server 160 may be part of wireless network 140 or accessible from wireless network 140 (e.g. via a direct link or via some other network such as another wireless network (not shown) or the Internet 150).

Wireless network 140 (including base stations 120) and/or access point(s) 130 can further communicatively connect the mobile device 105 to the Internet 150 and to entities, such as location server 160, accessible from the Internet 150 and/or from wireless network 140. Other embodiments may include other networks in addition, or as an alternative to, the Internet 150. Such networks can include any of a variety of public and/or private communication networks, including a wide area network (WAN), a local area network (LAN), and the like. Moreover, networking technologies can include switching and/or packetized networks utilizing optical, radio frequency (RF), wired, satellite, and/or other technologies.

The access point(s) 130 may be used for wireless voice and/or data communication with the mobile device 105. The access point(s) 130 can be part of a WiFi network (802.11x), cellular piconets and/or femtocells, Bluetooth network, and the like. The access point(s) 130 can also form part of an indoor positioning system—e.g. a positioning system as defined by the In-Location Alliance (ILA). Embodiments may include any number of access point(s) 130, any of which may be a moveable node, or may be otherwise capable of being relocated.

The wireless network 140 may support a CP location solution such as the CP location solution defined by 3GPP for LTE access or the CP solution defined by 3GPP for WCDMA. Alternatively or in addition, the wireless network 140 may support or enable mobile device 105 access to a user plane location solution such as the SUPL solution from OMA. In a CP solution, signaling (e.g. between mobile device 105 and location server 160) is carried over signaling interfaces for the wireless network 140 whereas in a user plane solution, signaling is carried as data (e.g. using the Transmission Control Protocol combined with the Internet Protocol (TCP/IP)) from the perspective of wireless network 140. In the case that wireless network 140 supports the 3GPP CP solution for LTE, location server 160 may be an E-SMLC. In the case that the wireless network supports or provides access to the SUPL user plane location solution, location server 160 may be an SLP and may further have a role as a Home SLP (H-SLP), a Discovered SLP (D-SLP) or an Emergency SLP (E-SLP). For both a CP solution and a user plane solution, location server 160 may support position methods such as A-GNSS, OTDOA, WLAN, SRN and/or other methods, and may benefit from receiving device-related information (e.g. vendor, model, version) for a target mobile device 105 at location server 160.

Location server 160 can further aid in the positioning of a mobile device 105 by implementing various positioning methods—e.g. A-GNSS, OTDOA, WLAN, SRN and the like. With OTDOA positioning, a mobile device 105 may measure the RSTD between PRS signals received from a particular reference cell (e.g. supported by one of base stations 120 or one of APs 130) and PRS signals received from each of one or more neighbor cells (e.g. each supported by one of base stations 120 or one of APs 130). The mobile device 105 or location server 160 may then determine the location of the mobile device 105 using multilateration techniques based on the RSTD measurements and the known locations of the antennas for the measured reference cell and measured neighbor cells. OTDOA positioning for LTE is defined in 3GPP TSs 36.355 and 36.211. With WLAN and SRN positioning, a mobile device 105 may measure the RTT, RSSI, S/N, angle of arrival (AOA) or other signal characteristics for one or more of the APs 130. The mobile device 105 or location server 160 may then determine a location for the mobile device 105 using triangulation, trilateration, multilateration, RF finger printing or other techniques based on the AP signal measurements and information such as the known locations of the measured APs, transmission characteristics of the APs and/or RF heat maps for the APs. WLAN and SRN positioning when used with the LPPe positioning protocol are defined in OMA TSs OMA-TS-LPPe-V1_0-20150414-C and OMA-TS-LPPe-V2_0-20141202-C. As described previously, these positioning methods can be adapted based on information obtained about a particular mobile device. Embodiments herein include techniques in which the mobile device 105 provides to the location server 160 non-unique device-related information such as OEM vendor ID, OEM model ID, OEM model version ID, a software or firmware release version ID, and/or, for each chipset in the mobile device 105 supporting a wireless interface, the chip vendor ID, chip vendor model ID, chip vendor model version ID, or any combination thereof. Location server 160 can use this information to provide positioning support and/or information gathering functions.

In a positioning support function, the location server 160 can use known information for a mobile device 105 to support positioning more effectively and/or efficiently. For example, the location server 160 can identify position methods and particular positioning related information such as particular measurements or particular assistance data that are best supported by the mobile device 105 and/or identify possible sources of error and/or calibration parameters for some measurements (e.g. RSSI, RTT, etc.). The location server can also make use of known faults or limitations of a mobile device to avoid erroneous or inaccurate location of the mobile device. In such cases, the location server 160 may use information about the OEM vendor, model and possibly version of a mobile device 105, information about a software or firmware release (e.g. for mobile device 105 or a chipset or wireless chipset in mobile device 105) and possibly information about one or more wireless chipsets contained in the mobile device 105 to obtain a positioning characteristic for the mobile device 105. The positioning characteristic may relate to some known capability, fault, limitation or other property of the mobile device 105 with regard to positioning of the mobile device 105. The location server 160 may use the positioning characteristic to provide certain location support to or on behalf of the mobile device 105. Examples of some positioning characteristics and their usage by a location server 160 to provide location support are provided in Table 1.

TABLE 1

Example A: The location server may be aware that, for target mobile devices of a certain OEM vendor and model, there is a positioning characteristic that is a limitation on OTDOA support. The limitation may be that RSTD measurements are only supported for a single LTE frequency corresponding to the LTE carrier frequency used for the serving cell for any target mobile device and that OTDOA RSTD measurements for other LTE frequencies are not supported. The location server may then make use of the positioning characteristic to avoid requesting inter-frequency OTDOA measurements from any UE corresponding to this OEM model and vendor.
Example B: The location server may be aware that, for target mobile devices of a certain OEM vendor and model, there is a positioning characteristic that is a property of RTT measurements obtained for WLAN APs. The property may be that any RTT measurement obtained by the target mobile device includes an additional delay D internal to the target mobile device. The value of this additional delay D may also be known by the location server (e.g. may have a statistical distribution with a known mean and variance) and the value of D (e.g. the mean of D) can then be subtracted by the location server from the provided RTT measurements to yield the correct RTT values for signal round trip signal propagation time.
Example C: The location server may be aware that, for target mobile devices of a certain OEM vendor, model and early version, there is a positioning characteristic that is a limitation on obtaining RSSI measurements for WLAN APs. The limitation may be that RSSI measurements are inaccurate for measurements below a certain threshold RSSI value (e.g. −50 dBm). The location server may further know that a later version of the target mobile device for the same vendor and model has been improved to provide accurate RSSI measurements for lower signals levels (e.g. down to −70 dBm). The location server may then ignore RSSI measurements provided by a target mobile device corresponding to the early version of this OEM vendor and model if below the threshold but may make use of such RSSI measurements to help locate a target mobile device corresponding to the later version.
Example D: The location server may be aware that, for target mobile devices of a certain OEM vendor and model, there is a positioning characteristic C that is a property of inter-frequency OTDOA measurements. The property may relate to performing OTDOA RSTD measurements between any reference cell R that uses a carrier

TABLE 1-continued frequency F1 and any neighbor cell N that uses a different carrier frequency F2. In performing such RSTD measurements, the target mobile device would normally measure the difference between the time of arrival (TOA) of a an LTE subframe carrying a PRS signal from cell R and the TOA of the closest LTE subframe carrying a PRS signal from the cell N as defined in 3GPP TS 36.214. For different frequencies F1 and F2, there may be a bias B in the RSTD measurement equal to the difference between the portion of each measured TOA that is internal to the target mobile device. Such a bias B may arise if the signals for the frequency F1 traverse a different internal path (e.g. different RF chain) inside the target mobile device prior to being measured to signals for the frequency F2. The bias B may also be similar or almost the same for all target mobile devices for the same OEM vendor and model and may correspond to the positioning characteristic C referred to above. If the location server is configured with statistics for the bias B (e.g. a mean and variance for B), the location server may adjust any RSTD measurement between the cells R and N, that was provided by the target mobile device, by adding or subtracting the bias B (e.g. the mean of the bias B) from this measurement. This may enable a more accurate location for the target mobile device.

Known information, such as known positioning characteristics of the types exemplified in Table 1, for different OEM vendors, models, and model versions as well as for different software or firmware release versions and/or different chip vendors, models, and model versions may be configured by a service provider or operator of the location server 160. Additionally or alternatively, this information may be collected by the location server 160 and/or by another server as described further down.

The information gathering function that may be supported by a location server 160 involves assembling information for mobile devices 105 to provide part or all of the "known information" and the "positioning characteristics" for the previously-mentioned positioning support function by gathering statistics from positioning of many mobile devices 105. For example, a location server 160 may observe certain limitations, faults or other properties when positioning many different target devices for the same vendor, model, version, and chipsets. The location server 160 may then assemble this data in a database to provide the positioning support function described above.

This information gathering function can be applicable to the examples in Table 1. For instance, to support the example A of Table 1, a location server 160 may observe that all target mobile devices 105 for a certain OEM vendor and model are unable to measure OTDOA values for any LTE frequency different to the serving cell carrier frequency (e.g. may respond with an error when instructed to perform such measurements or may simply ignore such an instruction).

To support the information gathering function for the example B of Table 1, the location server 160 may observe that a target 105 provides RTT measurements for one or more WLAN APs that do not enable the computation of a single position for the target 105 or do not enable computation of a position that is the same as a position for the target 105 computed using other position methods such as A-GNSS or OTDOA. The location server 160 may then estimate an error E in the RTT measurements provided by the target 105 by estimating the RTT measurement that the target 105 should have measured at a location for the target 105 computed using some other more reliable method (e.g. such A-GNSS or OTDOA) and then obtaining the error E as the difference between the measured RTT and the RTT that should have been measured. If the value of the error E is the same, nearly the same or has a common statistical distribution (e.g. a normal distribution) for all RTT measurements made by the target 105 and by all other targets 105 for the same OEM vendor and model, the location server may equate the error E (and any statistical distribution for E including a mean and variance) to the delay D (and any statistical distribution for D including a mean and variance) described for example B. The location server 160 may thereby determine a positioning characteristic for targets 105 for this OEM vendor and model corresponding to the known error E (and equivalent delay D). In addition or as an alternative, a location server 160 may simply try adding or subtracting different fixed errors E to the RTT measured values from the target device and may find that subtraction of a certain fixed value E enables computation of a consistent location estimate and/or a location estimate that agrees with location estimates computed using other position methods. The location server may observe that subtraction of the same fixed value E also enables correct location of other target devices of the same type.

To support the information gathering function for the example C of Table 1, the location server 160 may observe that it can obtain accurate location of a target device using RSSI measurements greater than some threshold (e.g. −50 dBm) but not using RSSI measurements below this threshold. The location server 160 may also observe that with target devices for a later version for the same OEM vendor and model, accurate location is possible using RSSI values that are lower than the previous threshold (e.g. down to −70 dBm). These observations may provide the information for the positioning characteristic for example C in Table 1.

To support the information gathering function for the example D in Table 1, a location server 160 may assume that typically a target device 105 will include some bias B as described for example D when obtaining OTDOA RSTD measurements between a reference cell R that uses a carrier frequency F1 and a neighbor cell N that uses a different carrier frequency F2. The assumption may be based on a target device 105 potentially using a different internal path (e.g. a different RF chain that may include different RF chips and/or different antennas) within the target device 105 to process and measure received RF signals at different frequencies. The location server may then regard the bias B as an additional unknown variable whose value can be obtained along with the unknown location coordinates of the target device 105 (e.g. the latitude, longitude and possibly altitude) using the RSTD measurements provided by the target device 105. The bias B may be introduced into an RSTD equation linking the RSTD measurement for the cells R and N to the location coordinates of the target device 105 and the known location coordinates for the antennas of the cells R and N by adding or subtracting the bias B to or from the RSTD measurement. The bias B may be introduced in the same way into any other RSTD equation linking the RSTD measurement for the reference cell R and any other cell N* that uses same frequency F2 as the cell N. Note that RSTD equations linking the RSTD measurements between the reference cell R and neighbor cells that use the same frequency F1 as the cell R would not be adjusted using the bias B. This kind of mathematical treatment is already known in the art and can enable a value for the bias B to be obtained along with the location of the target device 105 by solving the RSTD equations when more RSTD measurements (and thus more RSTD equations) are available than would minimally be needed to solve for the target device 105 location in the absence of any bias (i.e. with the bias B equal to zero). A location server 160 may obtain other values for the bias B from similar location computations involving RSTD measurements, provided by other mobile devices for the same OEM vendor and model, between cells using the two carrier frequencies F1 and F2. Moreover, it may not normally matter whether the reference cell for a particular location computation uses the frequency F1 or the frequency F2 as long as neighbor cells use the other frequency (e.g. use frequency F1 if the reference cell uses frequency F2). A location server 160 may then determine a fixed value for the bias B or a statistical distribution for the bias B (e.g. with a certain mean and variance) for all target devices for the same OEM vendor and model. This information may then be stored and form the positioning characteristic described for Example D in Table 1. It should be appreciated that a location server 160 can use the same technique to obtain a similar positioning characteristic in terms of a different bias B for any other pair of frequencies used by a pair of cells for which target devices for a given OEM vendor and model makes an RSTD measurement. A location server may also determine more than one bias when a target device provides a sufficient number of RSTD measurements made between a reference cell and a number of neighbor cells that use more than one frequency that is different to that of the reference cell. Further, a single bias B or a number of biases for different pairs of frequencies may be obtained by a location server 160 for target devices belonging to many different OEM vendors, models, versions and possibly with different wireless chips and/or different software or firmware release versions.

All of the observed information (e.g. as exemplified above) associated with inferred positioning characteristics for target devices for different OEM vendors, models and versions, different software or firmware release versions, and/or for different internal wireless chips may be configured by one or more location servers 160, which may share this observed information with other location servers. Thus, this observed information may be used later by the same or by different location servers to provide the positioning support function described earlier. In addition, a number of different servers may jointly support the information gathering function by each collecting information on positioning characteristics for different types of mobile device. While no one server may necessarily always have enough information to know every positioning characteristic accurately and reliably, when the information of several or all servers is combined (e.g. at a single central server or at each of the different servers), it may be possible to determine positioning characteristics more accurately and reliably. For example, information (e.g. location measurements, numeric values etc.) related to a particular positioning characteristic that is observed in a small number of mobile devices of a given type (e.g. for a given OEM vendor and OEM vendor model) by any one server may be combined with similar information related to the same or a similar positioning characteristic for the same (or similar) type of mobile device gathered by other servers. As one example, numeric values gathered by the different servers (such as the bias B for Example D in Table 1 or the delay D for Example B in Table 1) may be combined through averaging or weighted averaging or may be used to determine a statistical distribution for the numeric values (e.g. by determining a mean and variance). In addition, the combined information may be used to determine whether a positioning characteristic applies widely (e.g. is not just a statistical anomaly for a few mobile devices or for a particular server) and, if so, whether the positioning characteristic applies to all mobile devices of a certain OEM vendor, all mobile devices of a certain OEM vendor and OEM vendor model or just to mobile devices of a certain OEM vendor, vendor model and model version (or just mobile devices for the OEM vendor and model that use certain wireless chipsets).

Additionally, and unlike traditional techniques that require a location server database to be preconfigured for each mobile device type, the information gathering function of assembling information for mobile devices 105 can be applied to new mobile devices previously unknown to the location server 160 by making use of the provided information. For example, the location server 160 may receive from some target device, identifiers (IDs) for an OEM vendor, vendor model, model version and possibly a software or firmware release version and, for each of one or more wireless chipsets in the target, a chipset vendor, model and model version. The location server 160 may not recognize some or all of these IDs (e.g. may not be configured with the IDs). However, the location server 160 can still perform the information gathering function and observe and store information on one or more positioning characteristics for the target device and associate and store these observed capabilities and limitations with the received IDs. The location server can similarly perform the information gathering function for other target devices associated with the same set of OEM and wireless chipset IDs (or associated with a common subset of these IDs such as the same OEM vendor ID and same OEM vendor model ID) and may observe the same or similar positioning characteristics in these target devices as well. The location server may then combine positioning characteristics that are of the same type for the different mobile devices—e.g. via averaging or weighted averaging or by inferring a statistical distribution with a certain mean and variance in the case of a numeric positioning characteristic (e.g. such as the bias B in Example D in Table 1). The location server 160 or another location server can use the observed information (e.g. that may include the combined positioning characteristics for target devices that share all or a common subset of their OEM and/or chipset IDs) to help support location for a target device of the same type at a later time by matching all or a common subset of the OEM and/or chipset IDs received from the device with the IDs previously stored. Although the IDs may already be known to (e.g. configured in) the location server 160, as just described this is not necessary and information gathering can be possible for previously unknown OEM and/or chipset IDs. This may allow the function of identifying and adapting to a mobile device 105 to be supported without any preconfiguration. Thus, location server 160 may learn and adapt to new mobile devices previously unknown to the location server 160.

As an example, a known fault for a particular type of mobile phone may be corrected in a newer version of the phone, in a newer software or firmware version for the phone and/or in a newer chipset. When the new version is initially used, the location server 160 may assume the same functions and positioning characteristics, including the known fault, as for the previous version when identifying and adapting positioning support for the mobile phone. However, analysis of the assembled information for the new version of the mobile phone (e.g., by accumulating data over time from one or more mobile devices for the new version) may show a previous fault no longer appears and thus may be assumed by the location server 160 to have been corrected. This can then be utilized as "known information" and a new positioning characteristic for the new phone version when the location server 160 subsequently provides positioning support to other mobile phones for the new phone version.

Known information related to positioning characteristics for a particular type of mobile device can vary. As described in embodiments detailed herein, positioning characteristics can be indicative of various types of capabilities, limitations, faults and other properties related to the positioning of a particular mobile device type. In addition and/or as an alternative to any other capabilities described herein, known positioning characteristics for a particular mobile device type can generally include information such as supported air interface(s) (e.g., LTE, CDMA, WCDMA, GSM, WiFi, Bluetooth, etc.), supported measuring capabilities for a given interface (e.g., the ability to measure RSSI, RTT, S/N, AOA, observed time difference (OTD), TOA, RSTD, etc.), supported GNSS systems (if any), supported modes of positioning (e.g., UE assisted, UE based, standalone, etc.), supported types of assistance data (e.g., GNSS coarse time, GNSS fine time, GNSS bit prediction, GNSS almanac, GNSS ephemeris, base station almanac, annotated map, WiFi AP locations/transceiver locations, WiFi AP RF Heat Maps, etc.), whether or how the mobile device is capable of calculating location (including whether the location server is allowed to calculate location and whether hybrid position calculation is supported).

Some positioning characteristics of a particular mobile device 105 may be provided to a network (e.g. wireless network 140) and/or to a location server 160 as part of normal mobile device and network operation—e.g. may be provided to a network when the mobile device attaches to the network and may be provided to a location server 160 by the network and/or by the mobile device when the network or the mobile device requests positioning of the mobile device to the location server 160. For example, the LPP and LPPe positioning protocols enable a location server 160 to request and a mobile device 105 to provide, the positioning capabilities of the mobile device 105 relative to all the capabilities that can be supported by the LPP and LPPe positioning protocols (e.g. such as which position methods, position method assistance data and position method measurements in LPP and LPPe a mobile device 105 supports). The positioning characteristics which can be explicitly conveyed to a location server 160 in such manners may not need to be stored in a location server as part of known positioning characteristics for the type of the mobile device 105 (e.g. as known positioning characteristics for the OEM vendor, OEM model and OEM version of the mobile device 105).

However, there may be other "hidden positioning characteristics" that cannot be conveyed to a location server 160 either by a network 140 or mobile device 105 due to lack of protocol support for such conveyance and/or due to the information not being known to the network 140 and/or mobile device 105. Typically, such hidden positioning characteristics may be properties of a hardware and/or software implementation and not directly related to capabilities defined for different positioning protocols like LPP or LPPe or capabilities defined for normal operation of a mobile device. Because these hidden positioning characteristics may not be conveyed to a location server 160 using the positioning capabilities of a positioning protocol or by other explicit means, there may be added benefit to associating such hidden positioning characteristics with mobile device type IDs—e.g. for OEM and chipsets. Examples of such hidden positioning characteristics may include each of the positioning characteristics described in the Examples A-D in Table 1. Other examples of hidden positioning characteristics may include: (i) the measurement accuracy of a mobile device type (due to limitations in the mobile device and not as a result of external sources of error such as multipath and fading) for different types of measurements for different wireless interfaces (e.g. the accuracy of RTT and RSSI measurements for the IEEE 802.11 WiFi interface, the accuracy of RSTD measurements for OTDOA for LTE access, the accuracy of AOA measurements for Bluetooth access); (ii) the internal mobile device delay in obtaining different types of measurements; (iii) the ability to make different measurements serially or in parallel; (iii) different types of bias in making measurements for signals of different frequencies (e.g. such as the OTDOA inter-frequency bias B described for Example D in Table 1 or a similar bias between pseudorange measurements obtained for different GNSS systems that employ different carrier frequencies); (iv) different types of fixed additions to or fixed subtractions from measurements such as the additional delay D for RTT measurements described for Example B in Table 1; and (v) other functional modifications of measurements such as obtaining a measurement value equal to F(X) for a signal characteristic that has a correct value of X (if measured correctly) at the location of the mobile device where F is some fixed mathematical function with fixed parameters (e.g. a linear, quadratic or other polynomial function with fixed coefficients and/or fixed constants). A person of ordinary skill in the art will recognize that a variety of other possible positioning characteristics could be utilized as known positioning characteristics in embodiments of the invention. Such known positioning characteristics (both hidden and non-hidden) may be associated with the type of a mobile device and thus be capable of being inferred from knowledge of the type of mobile device (e.g. by knowing the OEM and chipset related IDs referred to herein previously). Further, as described previously, some of these positioning characteristics (e.g. the hidden positioning characteristics) may be determined by an information gathering function in a location server 160 as an alternative or in addition to being configured in a location server 160.

Figure 2:
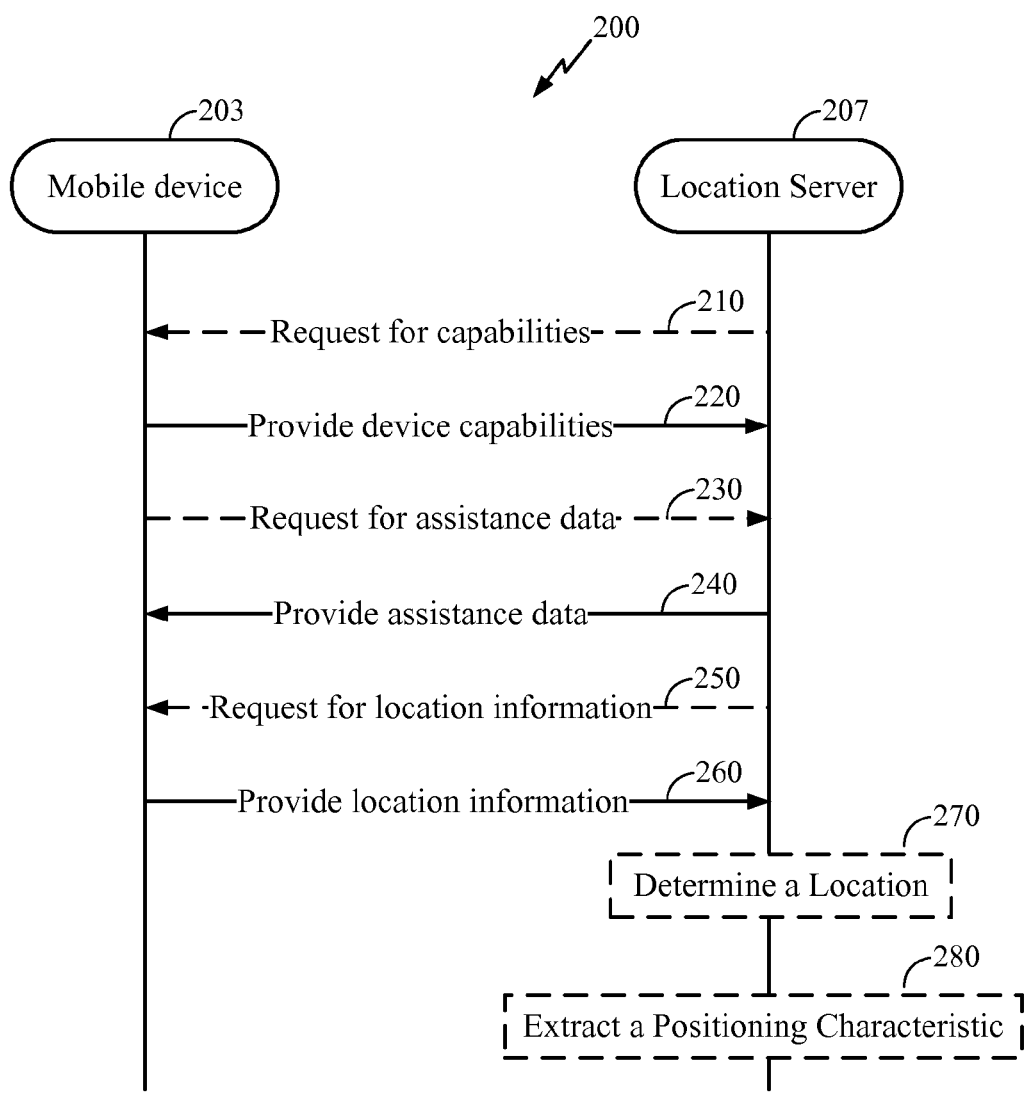
FIG. 2 is a message flow diagram showing the interaction between a mobile device and a location server at a protocol level for implementing the positioning functions described herein, according to one embodiment.

FIG. 2 is a message flow diagram showing a process 200 that illustrates the interaction between a mobile device 203 and location server 207 at a protocol level, according to one embodiment. For example, the interaction shown in FIG. 2 can be incorporated into positioning protocols, such as LPP and/or LPPe. The mobile device 203 and/or location server 207 can be implemented in a positioning system similar to the positioning system 100 of FIG. 1, and may correspond to mobile device 105 and/or location server 160, respectively. Moreover, the mobile device 203 and/or location server 207 can be implemented in software and/or hardware as respectively described in more detail with respect to FIGS. 5 and 6 below.

At block 210 the location server 207 optionally requests capabilities from the mobile device 203. The requested capabilities can include positioning capabilities and/or the non-unique device-related information previously described. In an embodiment, block 210 comprises sending an LPP/LPPe Request Capabilities message from location server 207 to mobile device 203. In some embodiments, such a request may be unnecessary. In either case, at block 220, the mobile device 203 provides non-unique device-related information to the location server 207—e.g. in association with providing its positioning capabilities. The non-unique device-related information may identify a type of mobile device, that may be used by location server 207 at blocks 240, 250 and 270 as described later, and may comprise one or more of an OEM vendor ID, an OEM model ID, an OEM version ID, a software or firmware release version ID, a wireless chip OEM vendor ID, a wireless chip OEM model ID and a wireless chip OEM version ID. In an embodiment, block 220 comprises sending an LPP/LPPe Provide Capabilities message from mobile device 203 to location server 207.

At block 230, the mobile device 203 optionally sends a request for assistance data to the location server 207, and assistance data is provided by the location server 207 at block 240 either in response to any request at block 230 or in the absence of such a request. The assistance data can include assistance data for A-GNSS (e.g. SV navigation data, almanac data, SV acquisition assistance data), assistance data for OTDOA (e.g. PRS information and timing information for LTE eNodeBs), assistance data for WLAN positioning (e.g. AP locations, AP identities and/or RF heat maps) and/or assistance data for other positioning methods. The assistance data may enable positioning using UE assisted mode and/or may enable use of UE based mode. The location server 207 may determine for which position methods to provide assistance data, which assistance data to provide for each position method and/or how to provide the assistance data to the mobile device 203, based on stored information about the type of the mobile device that may comprise one or more positioning characteristics for the mobile device 203. The type of the mobile device 203 can be based on the non-unique device-related information sent by mobile device 203 at block 220. The stored information including the positioning characteristics for the mobile device type may be configured in location server 207 and/or may be accumulated by an information gathering function in the location server 207 as described above. In an embodiment, block 230 comprises sending an LPP/LPPe Request Assistance Data message from mobile device 203 to location server 207. In an embodiment, block 240 comprises sending an LPP/LPPe Provide Assistance Data message from location server 207 to mobile device 203.

At block 250, the location server 207 optionally sends a request for location information to the mobile device 203. The location server 207 may adapt the request depending on the stored information about the type of the mobile device that may comprise one or more positioning characteristics for the type of the mobile device. For example, measurements may be requested at block 250 that a mobile device 203 is known to support well and may not be requested when a mobile device 203 is known to not support the measurement or not support the measurement accurately. Mobile device 203 then obtains and subsequently provides some or all of the location information requested at block 250 to the location server 207 at block 260 if block 250 occurs or provides location information at block 260 without a request if block 250 does not occur. The type of location information requested and provided can vary. For example, the location information can include measurements and/or a location estimate obtained by the mobile device 203. This information can depend on the positioning methods used, which, as previously indicated, can depend on the stored information including the positioning characteristics the location server 207 has regarding the type of the mobile device 203. In an embodiment, block 250 comprises sending an LPP/LPPe Request Location Information message from location server 207 to mobile device 203. In an embodiment, block 260 comprises sending an LPP/LPPe Provide Location Information message from mobile device 203 to location server 207.

At block 270, the location server 207 may use received location information at block 260 to determine or verify a location estimate for the mobile device 203 and possibly a velocity. The location server 207 may use stored information including one or more stored positioning characteristics for the type of mobile device 203 to determine how to treat and use some or all of the received location information. For example, if the type of mobile device 203 is known to measure RSSI for WLAN APs inaccurately below a threshold signal level (e.g. as described previously for Example C in Table 1), then any received measurements that have a value below this threshold may be discarded. Similarly, if the type of mobile device 203 is known to measure RTT for WLAN APs with an extra internal delay included whose value is known (e.g. as described previously for Example B in Table 1), this value may be subtracted from any RTT values returned by mobile device 203 at block 270. Similarly also, if a signal characteristic (e.g. RTT, RSSI, AOA, S/N, TOA) has a correct value of X at the location of the mobile device 203 and the type of mobile device is known to modify such a measurement by measuring an incorrect value of $F(X)$ where F is a known mathematical function with known parameters (e.g. a linear or quadratic function with known coefficients and constants), the location server 203 can recalibrate the incorrect measured value $F(X)$ to obtain the correct measured value X by transforming $F(X)$ into X using the inverse function G for F (i.e. the function G that satisfies $G(F(Y))=Y$ for all values of Y). Means for correcting other types of measurement errors caused by other known positioning characteristics of the mobile device 203 will be readily apparent to those with ordinary knowledge of the art. The location estimate for the mobile device 203 that is determined or verified at block 270 may be sent by the location server 207 (not shown in FIG. 2) to either the mobile device 203 or to some other entity. The other entity in this case may be an external client who needs the location of mobile device 203 to provide some service to mobile device 203 or to the user of mobile device 203 such a navigation assistance or provision of roadside assistance for a user in a vehicle or provision of emergency assistance in the case if an emergency call.

At block 280, the location server 207 (e.g. an information gathering function in the location server 207) may extract information regarding one or more positioning characteristics of the mobile device 203, based on the location information received at block 260 and/or based on subsequent location computation using this location information at block 270. The extracted information for the one or more positioning characteristics may be stored in a database, or combined (e.g. via averaging or weighted averaging) with information already in the database. The stored or combined information may then be used for future interactions with devices of the same (or similar) type as the mobile device 203—e.g. to support positioning as described above for blocks 210-270. For example, the location server 207 may observe, and may store or combine information in a database associated with observing, that the type of mobile device 203 provides erroneous WLAN RTT values for a WLAN of a certain type or produces low accuracy when measuring OTDOA values between eNodeBs operating at different LTE frequencies. Alternatively, the location server 207 may store in a database information regarding suspected or imprecise positioning characteristics if there is insufficient information to reliably pinpoint exact positioning characteristics and may store additional information about the suspected or imprecise positioning characteristics (e.g. may store the received measurements, location estimate or estimates calculated from some of the measurements). Subsequent offline analysis by the location server 207 or another server of all such stored information regarding suspected or imprecise positioning characteristics for many targets of the same mobile device type may then be used to find common patterns and reliably determine the exact positioning characteristics for many targets of the same mobile device type.

In some embodiments, a location server 207 may provide an RF heat map of a geographic area to a target device (e.g. at block 240 in FIG. 2) that contains expected RSSI, RTT, and/or S/N measurement values for a particular WLAN AP that would be expected to be measured by a particular reference device at different locations within the geographic area. The reference device may correspond to a particular type of mobile device for a particular OEM vendor, model and version. The different locations may in some embodiments comprise a rectangular grid of locations (e.g. locations separated by a distance of one meter in each of two perpendicular directions) within the geographic area covered by the RF heat map. In some embodiments, the area covered by the RF heat map (e.g., a building) may be separated into different regions using techniques and shapes other than a rectangular grid (e.g., rooms, hallways, and/or portions thereof), where each sub-region contains a set of locations (e.g. based on a rectangular grid) and where the RF heat map again provides the measurement values (e.g., RSSI, RTT, and/or S/N values) expected to be obtained by the particular reference device at each of the locations in that region. The location server 207 may then also provide to the mobile device 203 (e.g. as at block 240 in FIG. 2) information identifying the type of the reference device. This information could include the OEM vendor ID, OEM model ID, OEM model version ID, a software or firmware release version ID for the reference device and/or (for each chipset in the reference device supporting a wireless interface) the chip vendor ID, chip model ID, chip model version ID, or any combination thereof. The mobile device 203 may use this information in a variety of ways. In a first example embodiment, if the reference device is the same type of device as the mobile device 203 (that is, if the device type information, such as OEM and chipset IDs, for the reference device matches all or possibly some of the device type information for the target device), then no recalibration of the received RSSI, RTT or S/N values in the RF heat map may be needed. In this embodiment, a location server 207 could keep a few different versions of the same RF heat map already recalibrated for the most common device types (or for device types that do not support recalibration of an RF heat map). In a second example embodiment, a mobile device 203 may be configured by another server with RF heat map calibration parameters for different types of reference devices and may then use these parameters to recalibrate either received RF heat map values (e.g. for RSSI, RTT or S/N) for a particular reference device to match measurements that the mobile device 203 would make or measurements (e.g. of RSSI, RTT or S/N) made by the mobile device 203 to match values that the reference device would be expected to make. In different embodiments, recalibration of a measurement value (e.g. made by mobile device 203) or of an expected measurement value (e.g. for the reference device) may comprise adding or subtracting a known calibration parameter value to the measurement value or performing some other transformation of the measurement value (e.g. using a linear mathematical function with known fixed calibration parameters). The recalibration may be needed because the reference device and mobile device 203 each measure the same signal characteristic (e.g. RSSI or RTT) using different hardware and/or software and do not typically achieve exactly the same measured values. In a third example embodiment, a mobile device 203 may determine calibration parameters itself for a new reference device when an RF heat map for this reference device is first provided by a location server 207 using, for example, comparison of values (e.g. of RSSI, RTT or S/N) measured by mobile device 203 at one or more known locations versus expected values for the new reference device given in the RF heat map for these same locations. The mobile device 203 may then apply the determined calibration parameters to recalibrate new RF heat maps provided later by the location server 207 for the same reference device.

It is noted that although the example embodiments above provide specific ways in which assistance data can be provided (e.g., as RF heat maps), as well has how assistance data values may be recalibrated, or adjusted, embodiments are not so limited. In other embodiments, a location server 207 may provide additional or alternative information, which may be used in an alternative fashion.

Figure 3:
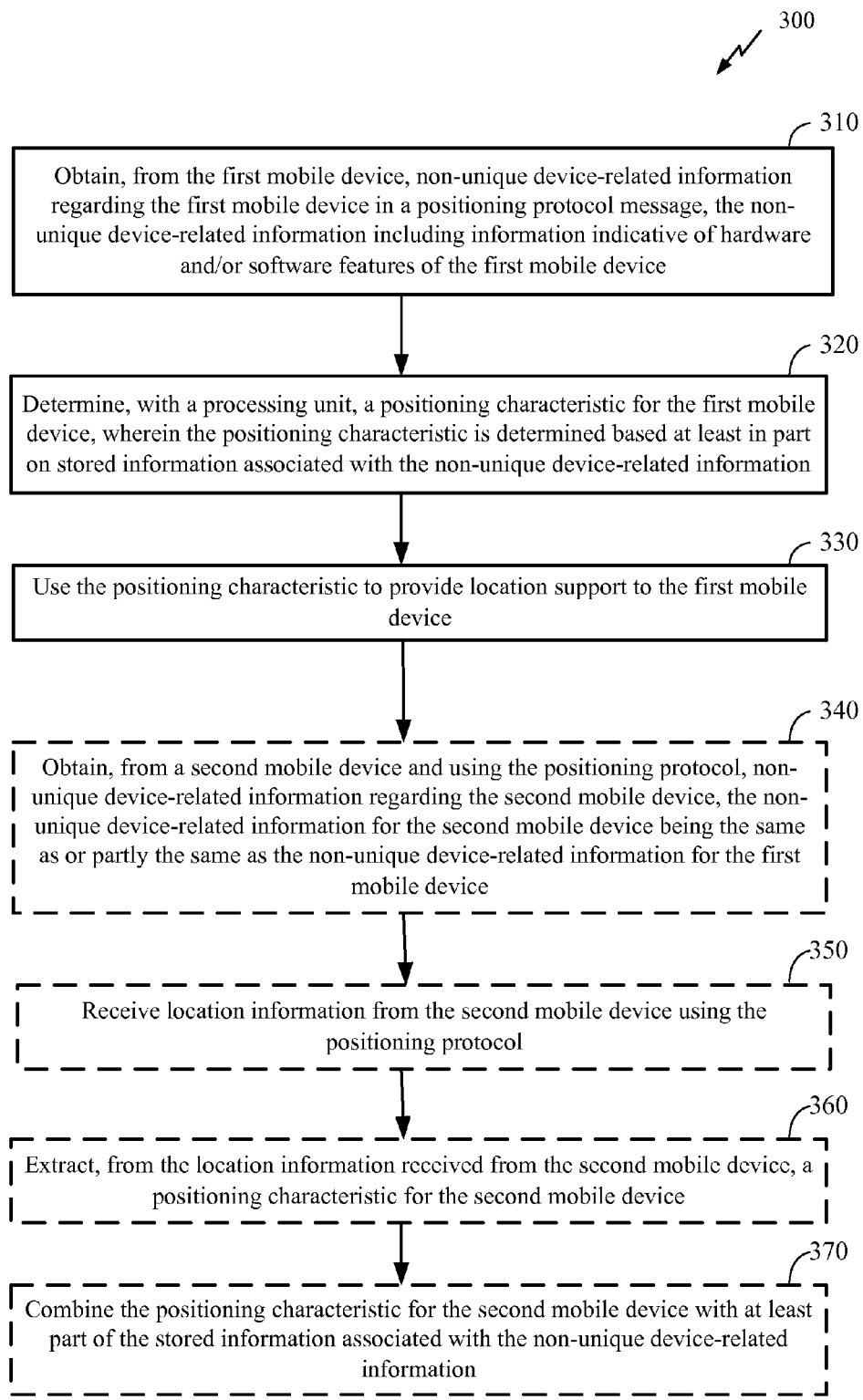
FIGS. 3 and 4 are process flow diagrams that illustrate methods of implementing the positioning functions described herein, according to one embodiment.
Figure 4:
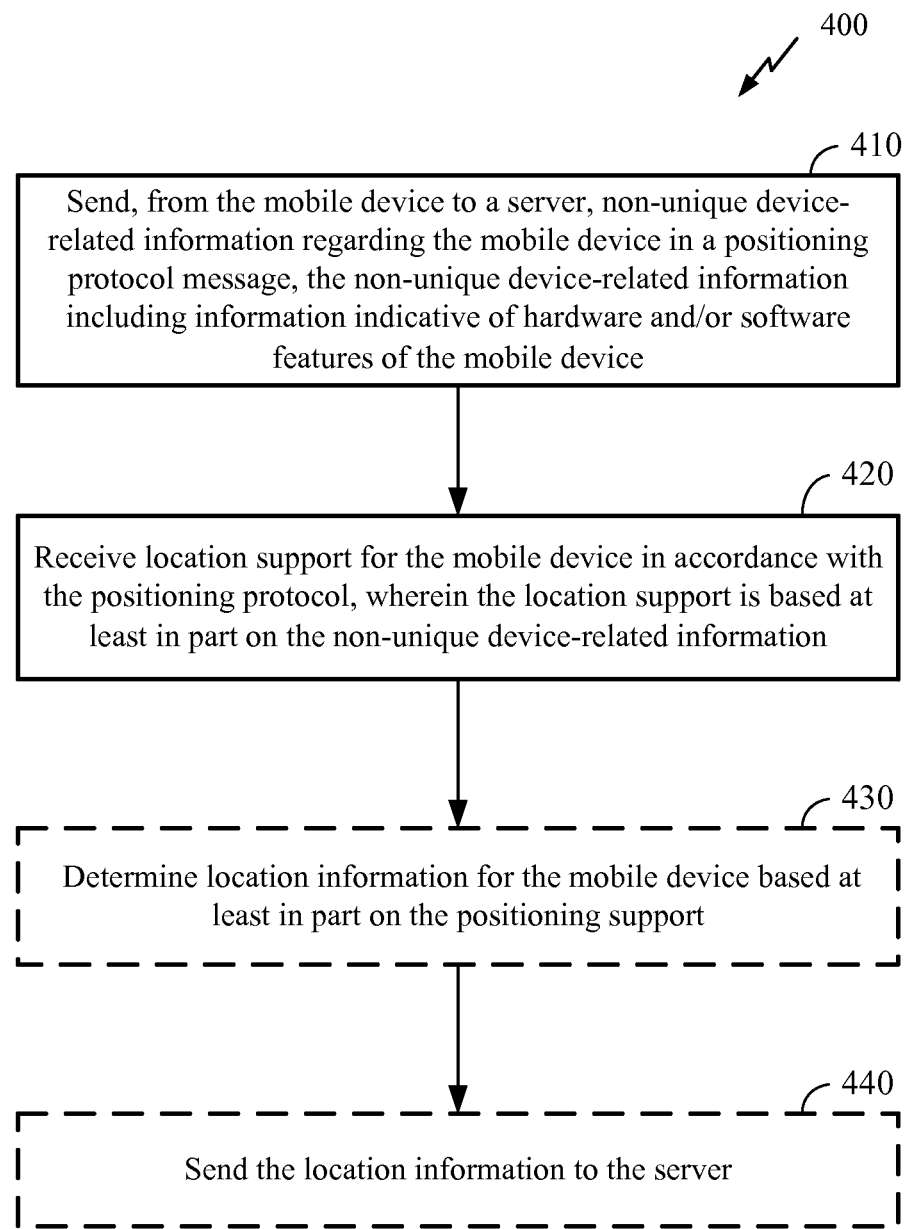

FIGS. 3 and 4 are process flow diagrams that illustrate exemplary methods 300 and 400 of implementing the above-described functions at a server and a mobile device, according to one embodiment. As with other figures provided herein, FIGS. 3 and 4 are provided as examples. Other embodiments of the invention may perform similar methods in different manners, by, for example, adding, omitting, combining, separating, rearranging, and/or otherwise altering the blocks illustrated in FIGS. 3 and 4. A person of ordinary skill in the art will recognize many variations.

With regard to FIG. 3, one or more blocks of the method 300 can be performed by a server, such as the location server 160 of the positioning system 100 of FIG. 1, for example, or the server 207 described in association with FIG. 2. Particular means for performing the illustrated blocks of method 300 can be performed by hardware and/or software components of a computer system, such as the example computer system illustrated in FIG. 6 and described in further detail below.

Referring first to FIG. 3, at block 310, non-unique, device-related information regarding a first mobile device is obtained from the first mobile device in a message, using a positioning protocol (a "positioning protocol message"). The positioning protocol may be the Long Term Evolution (LTE) Positioning Protocol (LPP), LPP Extensions (LPPe) or a combination of LPP with LPPe. Here, rather than a serial number or other unique identifier (which may need to be compared against a database to determine certain device features), the device-related information is not unique, but shared among devices of a particular device type. In particular, the non-unique, device-related information may be indicative of hardware and/or software features of the first mobile device. As described above, such information can include an OEM vendor ID, OEM model ID, OEM model version ID, a software or firmware release version ID, and/or, for each chipset in the first mobile device supporting a wireless interface, the chip vendor ID, chip model ID, chip model version ID, or any combination thereof.

The non-unique, device-related information can be obtained by the server from a mobile device in a variety of ways. As discussed in further detail above, it can be obtained via a positioning protocol such as the LPP, LPPe or combined LPP/LPPe protocol. Optionally, the non-unique device-related information can be received from the first mobile device in response to a request for the information sent by the server using the positioning protocol.

At block 320, a positioning characteristic for the first mobile device is determined, based at least in part on stored information associated with the non-unique, device-related information. As previously indicated, the non-unique, device-related information can be used by the server to identify a device type and/or other features about the first mobile device that may affect positioning support, and the server can then retrieve stored information about the device type and/or other features. Stored information can be indicative of positioning characteristics of the first mobile device, and can be associated with one or more IDs for the non-unique, device-related information gathered in block 310. The non-unique device-related information may include IDs for an Original Equipment Manufacturer (OEM) vendor, an OEM model, an OEM model version, a chip vendor, a chip model, a chip model version ID, a software or firmware release version, or any combination of these IDs. Furthermore, the stored information and positioning characteristic may be associated with: (i) just the OEM vendor ID (and apply to all OEM models, versions and chipsets for this OEM vendor); (ii) a particular OEM vendor ID and model ID (and apply to all OEM model versions and chipsets for this OEM vendor and model); (iii) a particular chipset vendor (and possibly chipset model) and apply to all OEMs that use this chipset vendor (and model); (iv) a particular software or firmware release version for either a particular OEM vendor, model and version or a particular chipset vendor, model and version and apply to all mobile devices that use this software or firmware release version in combination with either the particular OEM vendor, model and version or the particular chipset vendor, model and version; or (v) all provided IDs and not apply to a target device for which one or more of the IDs is/are different. As indicated previously, the stored information may include, for example, known information regarding the strengths and/or weaknesses of the particular type of the first mobile device, as identified using the non-unique device-related information and may in particular include positioning characteristics for the particular type of the first mobile device such as those exemplified in Table 1 above.

In an embodiment, the positioning characteristic determined for the first mobile device at block 320 may comprise one of the positioning characteristics exemplified in Table or as discussed in association with FIG. 1 previously. The positioning characteristic may therefore include one of: an inter-frequency bias for the Observed Time Difference Of Arrival (OTDOA) position method for Long Term Evolution (LTE); a bias between pseudorange measurements for different GNSS systems that employ different carrier frequencies; an additional delay for signal round trip propagation time (RTT) measurements for wireless local area network (WLAN) access points (APs); an accuracy of position measurements; an internal delay in obtaining position measurements; or a functional modification of positioning measurements according to a fixed mathematical function with fixed parameters. In some embodiments, more than one positioning characteristic may be determined for the first mobile device at block 320 based on the non-unique device-related information obtained at block 310.

At block 330, the positioning characteristic (or positioning characteristics) determined at block 320 is (or are) used to provide location support to the first mobile device. For example, the location support may include at least one of providing particular assistance data to the first mobile device using the positioning protocol (e.g. as exemplified at block 240 of FIG. 2), requesting particular location information from the first mobile device using the positioning protocol (e.g. as exemplified at block 250 of FIG. 2), or computing a location estimate for the first mobile device using location information received from the first mobile device using the positioning protocol (e.g. as exemplified at block 270 of FIG. 2). In an embodiment, the particular assistance data provided to the first mobile device as part of location support at block 330 may comprise a radio frequency (RF) heat map of an area, where the RF heat map includes one or more positioning values for each of a plurality of locations in the area as described previously on association with FIG. 2.

As an optional part of the method 300, a server may perform an information gathering function as described previously herein to obtain and store information including information on positioning characteristics for one or more mobile devices. The stored information may be used later to help provide location support to other mobile devices, for example when performing blocks 310-330 of method 300 for a different first mobile device. The information gathering function is exemplified in FIG. 3 by blocks 340-370 (and shown using dashed boxes in FIG. 3 as these are optional). It should be noted that while blocks 340-370 are shown as occurring after blocks 310-330, they may occur before blocks 310-330 or at the same time as blocks 310-330 in some embodiments. At block 340, the server may obtain, from a second mobile device and using the positioning protocol, non-unique device-related information regarding the second mobile device. The non-unique device-related information for the second mobile device may be the same as or partly the same as the non-unique device-related information for the first mobile device. For example, the non-unique device-related information for the first and second mobile devices may include a common OEM vendor ID and a common OEM model ID but may differ as regards an OEM vendor model version ID. Alternatively, all the OEM and chipset IDs for the non-unique device-related information for the first and second mobile devices may be the same.

At block 350, the server may receive location information from the second mobile device using the positioning protocol. For example, the server may request and later receive (e.g. using the positioning protocol) location related measurements from the second mobile device for nearby base stations (e.g. base stations 120 in FIG. 1), nearby APs (e.g. APs 130 in FIG. 1) and/or different SPS satellites (e.g. SPS satellites 110 in FIG. 1). The measurements may include a location estimate for the second mobile device, a location estimate for each of one or more base stations and/or APs broadcast or provided by each base station and/or AP to the second mobile device (or calculated by the second mobile device based on measurements related to each base station and/or AP), measurements of RTT, RSSI, S/N, AOA, RSTD, TOA, GNSS pseudorange and/or other measurements. Alternatively, the server may receive the location information from the second mobile device as part of crowdsourcing as described herein further down.

At block 360, the server may extract, from the location information received at block 350, a positioning characteristic (or a number of positioning characteristics) for the second mobile device. The extraction may be performed by observing or inferring various faults, limitations and other characteristics such as no support or restricted support for certain position methods, latency issues in certain situations, inaccurate measurements and so forth. These characteristics may be identified by the server by analyzing measurements for consistency (e.g., whether measurements imply the same or different locations, receiving error reports from the second mobile device, utilizing more than one positioning method and/or utilizing redundant measurements to determine consistency of location and measurements for the same position method and/or across different position methods, and so forth. Additionally or alternatively, the extracted positioning characteristic(s) can be indicative of aspects of positioning that the second mobile device performs particularly well, such as performing certain measurements, position methods, etc. The extracted positioning characteristic(s) may in some embodiments include one or more of an inter-frequency bias for the Observed Time Difference Of Arrival (OTDOA) position method for Long Term Evolution (LTE); a bias between pseudorange measurements for different GNSS systems that employ different carrier frequencies; an additional delay for signal round trip propagation time (RTT) measurements for wireless local area network (WLAN) access points (APs); an accuracy of position measurements; an internal delay in obtaining position measurements; or a functional modification of positioning measurements according to a fixed mathematical function with fixed parameters. In some embodiments, the extracted positioning characteristics may be treated by the server as tentative and unconfirmed and thus not assumed to be necessarily associated with the non-unique device-related information for the second mobile device until obtained from a number of other mobile devices sharing some or all of the same non-unique device-related information via repetitions of blocks 340-360. In some embodiments, repetitions of blocks 340-360 for other second mobile devices may be needed in order to determine for which parts of the non-unique device-related information, the extracted position characteristic(s) is (or are) related—for example, whether the extracted positioning characteristic(s) apply to all mobile devices for the same OEM vendor or just to all mobile devices for the same OEM vendor and OEM vendor model. In some embodiments, repetitions of blocks 340-360 for other second mobile devices may be needed to improve the accuracy of the determination of the extracted position characteristic(s) such as to accurately determine a statistical distribution (e.g. mean and variance) or a single value.

At block 370, the server may combine the positioning characteristic for the second mobile device extracted at block 360 with at least part of any stored information associated with the non-unique device-related information obtained at block 340. In the case of a numeric positioning characteristic (e.g. such as the bias B in Example D in Table 1), the combining may include averaging or weighted averaging of the positioning characteristic with information already stored for this positioning characteristic or may include inferring a statistical distribution for the positioning characteristic (e.g. with certain mean and variance). In addition, extracted positioning characteristics can be stored for the first time in instances where no stored information is available for a mobile device type (e.g., when a mobile device of a new model or containing a new chipset is encountered). Alternatively, for mobile devices of a type for which information is already stored, the extracted information can be used to refine and/or add to the stored information to help increase the accuracy of such stored information. The stored information can then be utilized in future instances when the server encounters a mobile device of the same type and performs the functionality of blocks 310-330 and/or blocks 340-370. Additionally or alternatively, the server may share extracted and/or stored information with other servers by storing the information on a database accessible to the other servers or otherwise communicating the extracted and/or stored information to the other servers.

In an embodiment, the positioning characteristic determined for the first mobile device at block 320 may be the same type of positioning characteristic as extracted for the second mobile device at block 360. In this case, the positioning characteristic for the first mobile device may be determined at block 320 based at least in part on the positioning characteristic extracted for the second mobile device at block 360. For example, the positioning characteristic for the first mobile device may be the same as the positioning characteristic extracted for the second mobile device at block 360 or may have been obtained from the positioning characteristics of a number of mobile devices that include the positioning characteristic extracted for the second mobile device at block 360.

Figure 6:
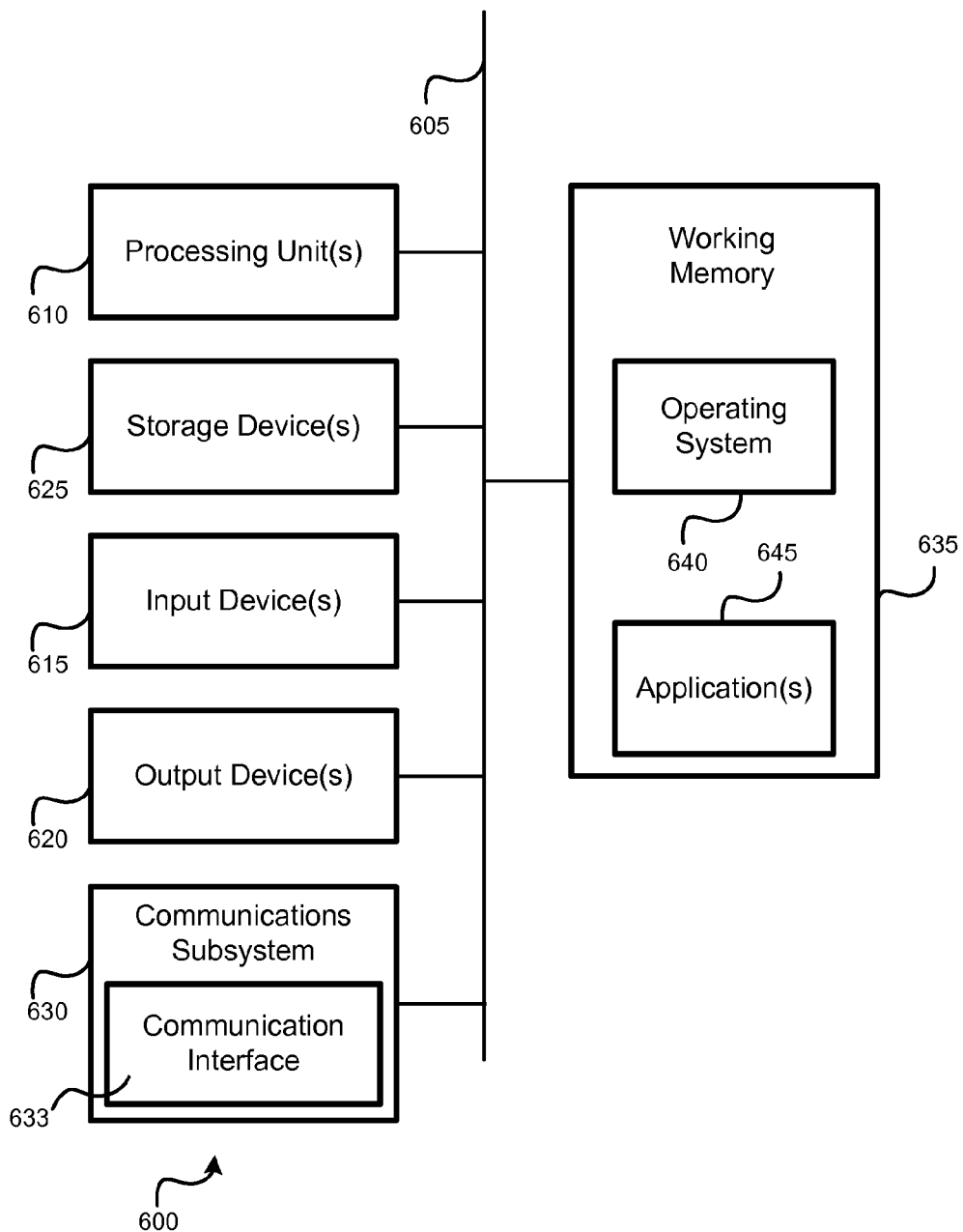
FIG. 6 is a block diagram of an embodiment of a computer system.

Means for performing the functionality of blocks 310-370 for method 300 for the process flow 300 of FIG. 3 can include, for example, the processing unit(s) 610, storage device(s) 625, communication interface 633, operating system 640, and/or application(s) 645 of a computer system as shown in FIG. 6.

Referring now to FIG. 4, the method 400 illustrates functions that mirror the functions of method 300, from the perspective of a mobile device. That is, one or more blocks of the method 400 can be performed by a mobile device, and may be performed in conjunction with a server performing the method 300 of FIG. 3. A mobile device can comprise the mobile device 105 of the positioning system 100 of FIG. 1, for example, or the mobile device 203 of the process 200 of FIG. 2 as another example. Particular means for performing the illustrated blocks of method 400 can be performed by hardware and/or software components of a mobile device, such as the example mobile device illustrated in FIG. 5 and described in further detail below.

Figure 5:
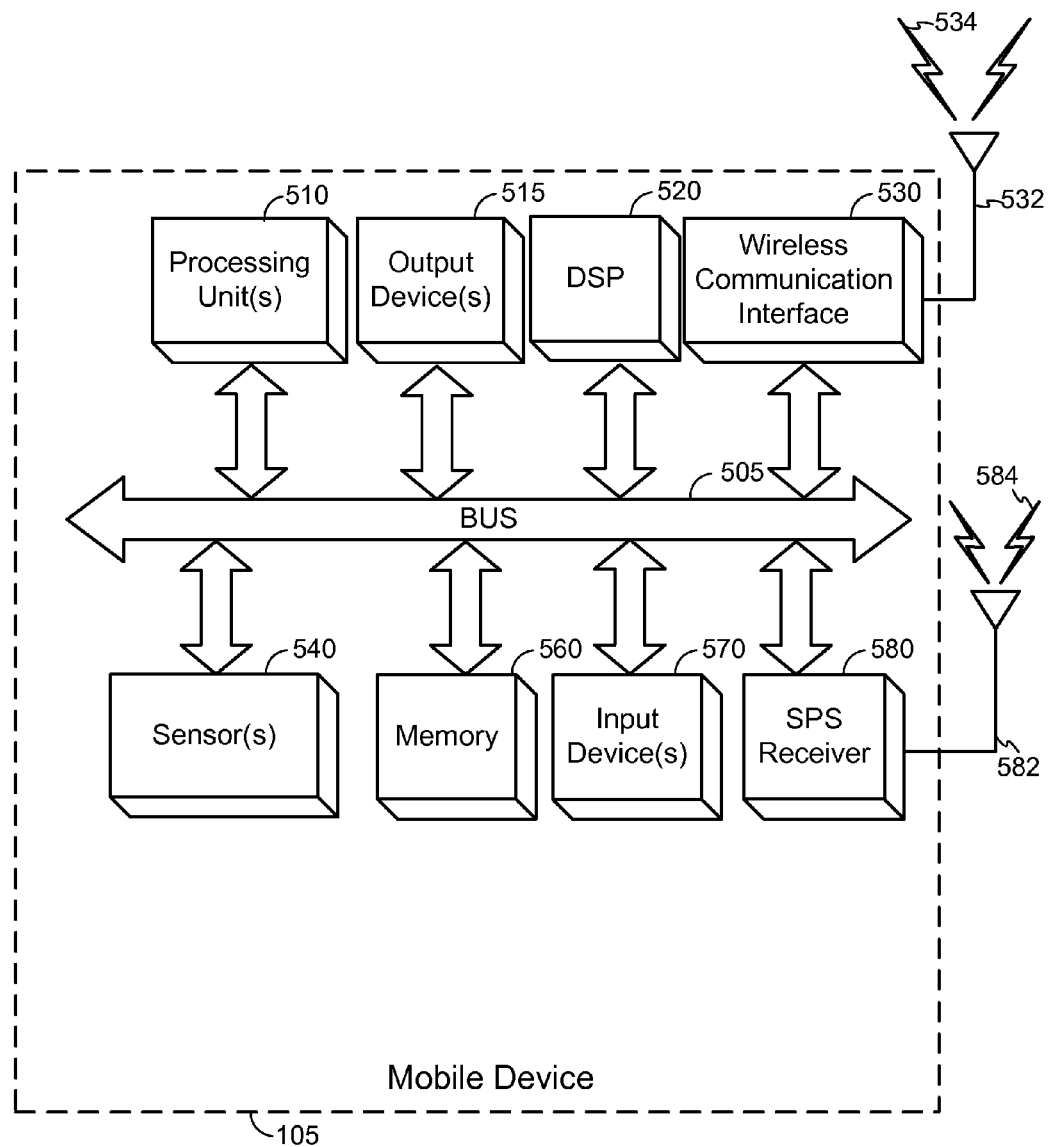
FIG. 5 is a block diagram of an embodiment of a mobile device.

At block 410, non-unique, device-related information regarding the mobile device is sent in a message, using a positioning protocol, to a server (e.g. the location server 160 of FIG. 1, the location server 207 of FIG. 2 or a server performing the exemplary method 300 of FIG. 3). In one embodiment, the non-unique device-related information may be sent in response to a request received (e.g. using the positioning protocol) by the mobile device from the server (not shown in FIG. 4). In a further embodiment, the positioning protocol may be LPP, LPPe or a combination of LPP and LPPe (LPP/LPPe). As described above, the non-unique, device-related information can include any of a variety of non-unique identifying information for the mobile device. For example, the non-unique device-related information may include an identification for one or more of: an OEM vendor, an OEM model, an OEM model version, a chip vendor, a chip model, a chip model version ID, a software or firmware release version, or any combination thereof. This information may be stored in a memory of the mobile device. Depending on desired functionality, this information may be preprogrammed into the memory of the mobile device and/or obtained directly from components of the mobile device that have the non-unique, device-related information (e.g., firmware, a chipset, etc.). Means for performing the functionality of block 410 can include, for example, the processing unit(s) 510, bus 505, memory 560, wireless communication interface 530, and/or wireless communication antenna(s) 532 of a mobile device 105 as shown in FIG. 5.

At block 420, location support for the mobile device is received in accordance with the positioning protocol, based at least in part on the non-unique, device-related information. As indicated elsewhere herein (e.g. for the process 200 of FIG. 2 and the exemplary method 300 of FIG. 3), the location support can include at least one of receiving particular assistance data from the server using the positioning protocol (e.g. as at block 240 in FIG. 2), receiving a request for particular location information from the server using the positioning protocol (e.g. as at block 250 in FIG. 2), or determining a location estimate for the mobile device by the server (e.g. as at block 270 in FIG. 2) based on location information sent by the mobile device using the positioning protocol. In the case of determining a location estimate, the server may provide the location estimate to the mobile device (thereby benefiting the mobile device directly) or may provide the location estimate to some other entity (e.g. a navigation assistance server or a Public Safety Answering Point) which may then provide some service to the mobile device or user of the mobile device based on the location estimate (thereby benefitting the mobile device or user of the mobile device indirectly).

The particular assistance data in block 420 may be determined by the server to be applicable or otherwise suitable to one or more positioning characteristics possessed by a type of the mobile device (as indicated by the non-unique, device-related information sent at block 410). For example, if a type of the mobile device has a positioning characteristic that indicates the mobile device is able to reliably compute its location using a hybrid combination of position methods (such as UE based Assisted GNSS and UE based OTDOA), the server may send assistance data for several UE based position methods with an expectation that the mobile device will be able to use the assistance data effectively. In an embodiment, the particular assistance data may comprise a radio frequency (RF) heat map of an area, with the RF heat map having one or more positioning values (e.g. RSSI values or RTT values) for each of a plurality of locations in the area. The mobile device may also receive from the server (e.g. as part of the particular assistance data) information regarding a reference device corresponding to the RF heat map and may then adjust (e.g. recalibrate) some or all of the positioning values in the RF heat map for one or more of the locations in the heat map area based on the information regarding the reference device. This recalibration may convert the RF heat map positioning values from values applicable to the reference device into values applicable to the mobile device, as described previously in association with FIG. 2. Means for performing the functionality of block 420 can include, for example, the processing unit(s) 510, bus 505, memory 560, wireless communication interface 530, and/or wireless communication antenna(s) 532 of a mobile device 105 as shown in FIG. 5.

At block 430, which may be performed optionally (and is therefore shown as a dashed box), location information for the mobile device is determined by the mobile device based at least in part on the location support received at block 420 (e.g. based on the particular assistance data received and/or on the request for particular location information). For example, the location information determined at block 430 may correspond to the particular location information requested at block 420. The location information may include obtaining particular location measurements (e.g. of RTT, RSSI, S/N, AOA and/or RSTD) for one or more nearby bases stations and/or WLAN APs, obtaining SPS pseudoranges for one or more GNSS systems and/or determining a location estimate and/or velocity estimate for the mobile device. Means for performing the functionality of block 430 can include, for example, the processing unit(s) 510, bus 505, wireless communication interface 530, SPS receiver 580, and/or memory 560 of a mobile device 105 as shown in FIG. 5.

Optionally, at block 440, the location information determined at block 430 may be sent by the mobile device to the server using the positioning protocol. For example, the location information may be sent if the mobile device had received a request for particular location information at block 420. The server may then utilize the location information to provide location-based services to the mobile device or to some other entity, and/or to determine characteristics and behavior of devices having the same or similar non-unique, device-related information as the mobile device. As indicated elsewhere herein, the server can utilize information regarding the characteristics and behavior of devices and adapt positioning support to better complement these characteristics and behavior. Means for performing the functionality of block 440 can include, for example, the processing unit(s) 510, bus 505, memory 560, wireless communication interface 530, and/or wireless communication antenna(s) 532 of a mobile device 105 as shown in FIG. 5.

If can be noted that, although embodiments in FIGS. 3 and 4 describe obtaining and sending the non-unique device-related information regarding the mobile device in a positioning protocol message and using the same positioning protocol for other interactions between a mobile device and a server (e.g. to convey assistance data from a server to a mobile device and to convey location information from a mobile device to a server), other embodiments may not be so limited. Other standards and/or protocols may be used in alternative embodiments.

It should be noted that the previous embodiments (e.g. as described in association with FIGS. 1-4) include (i) obtaining information concerning one or more positioning characteristics for a mobile device as a result of positioning of the mobile device (e.g. at block 280 in FIG. 2 and at block 360 in FIG. 3) and (ii) making use of already obtained information concerning one or more positioning characteristics to assist in positioning of a mobile device (e.g. at blocks 240, 250 and 270 in FIG. 2 and at block 330 in FIG. 3). However, positioning characteristics associated with device type information (e.g. OEM and chipset IDs) may also be obtained by a location server from one or more mobile devices as a result of crowdsourcing. For example, device IDs including OEM vendor, model and version IDs, software or firmware release version ID, and/or wireless chipset IDs may be included in messages (e.g. positioning protocol messages) sent to a location server as part of crowdsourcing and carrying location related measurements (e.g. RSSI, RTT, S/N, RSTD, AOA) made by a mobile device of radio signals received from nearby base stations and/or APs (e.g., base stations 120 and/or APs 130 of FIG. 1). The location related measurements may typically be used by the location server to infer characteristics of the measured base stations and/or APs (e.g. their transmit powers, signal timing, locations) which may be stored (e.g. as base station almanac (BSA) data) and used later by the location server to (i) help determine the locations of other mobile devices by the location server and/or (ii) provide assistance data that is sent to other mobile devices to assist these other mobile devices to determine their locations. A location server may also use any device IDs (e.g. OEM and chipset IDs) received in messages from mobile devices containing crowdsourced measurements to infer characteristics about the sending mobile devices—e.g. may use the crowdsourced measurements to locate the sending mobile devices and infer positioning characteristics related to the resulting locations and original measurements as exemplified in examples A, B, C and D of Table 1. The inferred positioning characteristics may be stored and used later to assist with positioning of other mobile devices of the same type. Alternatively or in addition, a location server may use known positioning characteristics for any mobile device that has sent crowdsourcing measurements to the location server together with its device IDs (e.g. OEM and chipset IDs) to adjust the received crowdsourcing measurements. For example, if a certain type of mobile device is known to report inaccurate RSSI values below −50 dBm, any received RSSI values below this level may be discarded. Similarly if a type of mobile device is known to include a fixed additional internal delay in RTT measurements for certain types of APs, a location server may subtract the known fixed additional internal delay from any received RTT values received as part of crowdsourcing before making use of the RTT values (e.g. to help compile BSA data). The known positioning characteristics of a mobile device may be obtained by previous positioning of the same type of mobile device (e.g. as described for blocks 340-370 of FIG. 3) and/or may be obtained from crowdsourcing measurements sent by the same type of mobile device as described above.

FIG. 5 illustrates an embodiment of a mobile device 105, which can be utilized as described herein above. For example, the mobile device 105 can be used in the positioning system 100 of FIG. 1, to implement the method shown in FIG. 4, and/or may correspond to and perform the functions of mobile device 203 as described for FIG. 2. It should be noted that FIG. 5 is meant only to provide a generalized illustration of various components, any or all of which may be utilized as appropriate. It can be noted that, in some instances, components illustrated by FIG. 5 can be localized to a single physical device and/or distributed among various networked devices, which may be disposed at different physical locations.

The mobile device 105 is shown comprising hardware elements that can be electrically coupled via a bus 505 (or may otherwise be in communication, as appropriate). The hardware elements may include a processing unit(s) 510 which can include without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein, including the functionality shown in FIGS. 2 and 4. As shown in FIG. 5, some embodiments may have a separate DSP 520, depending on desired functionality. The mobile device 105 also can include one or more input devices 570, which can include without limitation a touch screen, a touch pad, microphone, button(s), dial(s), switch(es), and/or the like; and one or more output devices 515, which can include without limitation a display, light emitting diode (LED), speakers, and/or the like.

The mobile device 105 might also include a wireless communication interface 530, which can include without limitation a modem, a network card, an infrared communication device, a wireless communication device, and/or a chipset (such as a Bluetooth™ device, an IEEE 802.11 device, an IEEE 802.15.4 device, a WiFi device, a WiMax device, cellular communication facilities (e.g. for LTE), etc.), and/or the like. The wireless communication interface 530 may permit data to be exchanged with a network, wireless access points, other computer systems, and/or any other electronic devices described herein. The communication can be carried out via one or more wireless communication antenna(s) 532 that send and/or receive wireless signals 534. The wireless communication interface 530 may also enable location related measurements to be obtained by mobile device 105 (e.g. measurements of RTT, RSSI, S/N, AOA and/or RSTD) which may be employed to provide location related information to a location server (e.g. as at block 260 in FIG. 2) and support the various techniques described herein (e.g. such as providing location information applicable to that received for block 350 of FIG. 3).

Depending on desired functionality, the wireless communication interface 530 can include separate transceivers to communicate with base stations (e.g., base stations 120 of FIG. 1)) and/or access point(s) (e.g., access point(s) 130 of FIG. 1) that may be part of or be linked to one or more wireless networks (e.g. wireless network 140 of FIG. 1). As indicated previously with respect to FIG. 1, a wireless network can be a WWAN and include various network types such as a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband CDMA (WCDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and WCDMA are described in documents from 3GPP. Cdma2000 is described in documents from a consortium named "3rd Generation Partnership Project 2" (3GPP2). 3GPP and 3GPP2 documents are publicly available. A wireless network may also comprise or include a WLAN or a Wireless Personal Area Network (WPAN). A WLAN may be an IEEE 802.11x network or a Bluetooth network, and a WPAN may be a Bluetooth network, an IEEE 802.15x, or some other type of network. The techniques described herein may also be used for any combination of WWAN, WLAN and/or WPAN.

The mobile device 105 can further include sensor(s) 540. Such sensors can include, without limitation, one or more accelerometer(s), gyroscope(s), camera(s), magnetometer(s), altimeter(s), microphone(s), proximity sensor(s), light sensor(s), and the like. Some or all of the sensor(s) 540 can be utilized, among other things, for dead reckoning and/or other positioning methods. In some embodiments, sensor(s) 540 may be used to determine a location of the mobile device as described in embodiments herein, including embodiments shown in FIGS. 2 and 4.

Embodiments of the mobile device may also include an SPS receiver 580 capable of receiving signals 584 from one or more SPS satellites (such as SPS satellites 110 of FIG. 1 and SPS satellites for a GNSS) using an SPS antenna 582 which may be used to help position the mobile device. Such positioning can be utilized to complement and/or incorporate the techniques described herein. The SPS receiver 580 may extract SPS measurements (e.g. pseudoranges) from which the position of the mobile device may be determined by the mobile device (e.g. using processing unit(s) 510) or by a separate location server (e.g. location server 160 of FIG. 1), using conventional techniques already known for SPS and GNSS systems. An SPS system may be a GNSS system such as Global Positioning System (GPS), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 580 can use various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile device 105 may further include and/or be in communication with a memory 560. The memory 560 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 560 of the mobile device 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above, such as the mobile device functionality shown in FIGS. 2 and 4, may be implemented as code and/or instructions executable by the mobile device 105 (and/or a processing unit within a mobile device 105) (and/or another device of a positioning system). In an aspect, then, such code and/or instructions can be used to configure and/or adapt a general purpose computer (or other device) to perform one or more operations in accordance with the described methods.

FIG. 6 illustrates an embodiment of a computer system 600, which may be incorporated, at least in part, into devices such as the location server 160 of FIG. 1, location server 207 of FIG. 2, a location server that performs some or all of the techniques described herein, and/or a computing device incorporated and/or communicatively connected therewith, as described herein. FIG. 6 provides a schematic illustration of one embodiment of a computer system 600 that can perform the methods provided by various other embodiments, such as the method described in relation to FIG. 3 and/or the functionality of the location server 207 as shown in FIG. 2. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner. In addition, it can be noted that components illustrated by FIG. 6 can be localized to a single device and/or distributed among various networked devices, which may be disposed at different physical locations.

The computer system 600 is shown comprising hardware elements that can be electrically coupled via a bus 605 (or may otherwise be in communication, as appropriate). The hardware elements may include processing unit(s) 610, which can include without limitation one or more general-purpose processors, one or more special-purpose processors (such as digital signal processing chips, graphics acceleration processors, and/or the like), and/or other processing structure, which can be configured to perform one or more of the methods described herein, including the method described in relation to FIG. 3 and/or the functionality of the location server 207 as shown in FIG. 2. The computer system 600 also can include one or more input devices 615, which can include without limitation a mouse, a keyboard, a camera, a microphone, other biometric sensors, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. In addition, storage devices 625 may be used to store information related to different types of mobile device including device IDs for each type of mobile device (e.g. OEM and/or chipset IDs) and positioning characteristics associated with these devices IDs (e.g. such as the positioning characteristics exemplified in Examples A-D in Table 1).

The computer system 600 may also include a communications subsystem 630, which can include wireless and/or wired communication technologies managed and controlled by a communication interface 633. The communications subsystem can include a modem, a network card (wireless or wired), an infrared communication device, a wireless communication device, and/or a chipset (such as a Bluetooth™ device, an IEEE 802.11 device, an IEEE 802.15.4 device, a WiFi device, a WiMax device, cellular communication facilities, UWB interface, etc.), and/or the like. The communications subsystem 630 may include one or more input and/or output communication interfaces, such as the communication interface 633, to permit data to be exchanged with a network, mobile devices (such as the mobile device 105 of FIGS. 1 and 5 or mobile device 203 of FIG. 2), other computer systems, and/or any other electronic devices described herein. The communication subsystem 630 may support communication based on the Internet Protocol (IP) and/or other data related protocols (e.g. TCP, UDP) and may enable communication with other entities (e.g. a mobile device 105) via a wireless network (e.g. wireless network 140 of FIG. 1) and/or the Internet.

In many embodiments, the computer system 600 will further comprise a working memory 635, which can include a RAM or ROM device, as described above. Software elements, shown as being located within the working memory 635, can include an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 3 and/or the functionality of the location server 207 as shown in FIG. 2, might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 625 described above. In some cases, the storage medium might be incorporated within a computer system, such as computer system 600. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method of using device-related information for positioning of a first mobile device, the method comprising:
obtaining, from the first mobile device, non-unique device-related information regarding the first mobile device in a message, using a positioning protocol, the non-unique device-related information comprising:
an Original Equipment Manufacturer (OEM) vendor,
an OEM model,
an OEM model version,
a chip vendor,
a chip model, or
a chip model version ID,
or any combination thereof;

determining, with a processing unit, a positioning characteristic for the first mobile device, wherein the positioning characteristic for the first mobile device is determined based at least in part on the non-unique device-related information; and using the positioning characteristic for the first mobile device to provide location support to the first mobile device.

2. The method of claim 1, wherein the location support comprises at least one of providing particular assistance data to the first mobile device using the positioning protocol, requesting particular location information from the first mobile device using the positioning protocol, or computing a location estimate for the first mobile device using location information received from the first mobile device using the positioning protocol.

3. The method of claim 2, wherein the particular assistance data comprises a radio frequency (RF) heat map of an area, the RF heat map having one or more positioning values for each of a plurality of locations in the area.

4. The method of claim 1, wherein the positioning characteristic for the first mobile device comprises:
an inter-frequency bias for Observed Time Difference Of Arrival (OTDOA) position method for Long Term Evolution (LTE);
a bias between pseudorange measurements for different GNSS systems that employ different carrier frequencies;
an additional delay for signal round trip propagation time (RTT) measurements for wireless local area network (WLAN) access points (APs);
an accuracy of position measurements;
an internal delay in obtaining position measurements; or
a functional modification of positioning measurements according to a fixed mathematical function with fixed parameters.

5. The method of claim 1, further comprising:
obtaining, from a second mobile device and using the positioning protocol, non-unique device-related information regarding the second mobile device, the non-unique device-related information for the second mobile device being the same as or partly the same as the non-unique device-related information for the first mobile device;
receiving location information from the second mobile device using the positioning protocol;
extracting, from the location information received from the second mobile device, a positioning characteristic for the second mobile device; and
combining the positioning characteristic for the second mobile device with at least part of stored information associated with the non-unique device-related information.

6. The method of claim 5, wherein the positioning characteristic for the first mobile device is determined at least in part based on the positioning characteristic for the second mobile device.

7. The method of claim 1, wherein the positioning protocol comprises Long Term Evolution (LTE) Positioning Protocol (LPP) or LPP Extensions (LPPe).

8. The method of claim 1, further comprising communicating a request for the non-unique device-related information to the first mobile device using the positioning protocol.

9. A method of using device-related information for positioning of a mobile device, the method comprising:
sending, from the mobile device to a server, non-unique device-related information regarding the mobile device in a message, using a positioning protocol, the non-unique device-related information and comprising:
an Original Equipment Manufacturer (OEM) vendor,
an OEM model,
an OEM model version,
a chip vendor,
a chip model, or
a chip model version ID,
or any combination thereof; and
receiving location support for the mobile device in accordance with the positioning protocol, wherein the location support is based at least in part on the non-unique device-related information.

10. The method of claim 9, wherein the location support comprises at least one of receiving particular assistance data from the server using the positioning protocol, receiving a request for particular location information from the server using the positioning protocol, or determining a location estimate for the mobile device by the server based on location information sent by the mobile device using the positioning protocol.

11. The method of claim 10, wherein the particular assistance data comprises a radio frequency (RF) heat map of an area, the RF heat map having one or more positioning values for each of a plurality of locations in the area.

12. The method of claim 11, further comprising:
receiving information regarding a reference device corresponding to the RF heat map; and
adjusting the one or more positioning values for at least one location in the plurality of locations in the area based on the information regarding the reference device.

13. The method of claim 9, wherein the positioning protocol comprises Long Term Evolution (LTE) Positioning Protocol (LPP) or LPP Extensions (LPPe).

14. The method of claim 9, wherein the non-unique device-related information regarding the mobile device is sent using the positioning protocol in response to a request received, by the mobile device from the server, for the non-unique device-related information regarding the mobile device.

15. A server comprising:
a communications interface;
a memory;
a processing unit communicatively coupled with the communications interface and the memory, the processing unit configured to cause the server to:
obtain, from a first mobile device via the communications interface, non-unique device-related information regarding the first mobile device in a message, using a positioning protocol, the non-unique device-related information comprising:
an Original Equipment Manufacturer (OEM) vendor,
an OEM model,
an OEM model version,
a chip vendor,
a chip model, or
a chip model version ID,
or any combination thereof;
determine a positioning characteristic for the first mobile device, wherein the positioning characteristic for the first mobile device is determined based at least in part on the non-unique device-related information; and
use the positioning characteristic for the first mobile device to provide location support to the first mobile device via the communications interface.

16. The server of claim 15, wherein the processing unit is configured to cause the server to provide the location support by: providing particular assistance data to the first mobile device using the positioning protocol, requesting particular location information from the first mobile device using the positioning protocol, computing a location estimate for the first mobile device using location information received from the first mobile device using the positioning protocol, or any combination thereof.

17. The server of claim 16, wherein the processing unit is configured to cause the server to provide the particular assistance data, the particular assistance data comprising a radio frequency (RF) heat map of an area, the RF heat map having one or more positioning values for each of a plurality of locations in the area.

18. The server of claim 15, wherein the processing unit is configured to cause the server to use the positioning characteristic for the first mobile device by using one or more of:
an inter-frequency bias for Observed Time Difference Of Arrival (OTDOA) position method for Long Term Evolution (LTE);
a bias between pseudorange measurements for different GNSS systems that employ different carrier frequencies;
an additional delay for signal round trip propagation time (RTT) measurements for wireless local area network (WLAN) access points (APs);
an accuracy of position measurements;
an internal delay in obtaining position measurements; or
a functional modification of positioning measurements according to a fixed mathematical function with fixed parameters.

19. The server of claim 15, wherein the processing unit is configured to cause the server to:
obtain, from a second mobile device and using the positioning protocol via the communications interface, non-unique device-related information regarding the second mobile device, the non-unique device-related information for the second mobile device being the same as or partly the same as the non-unique device-related information for the first mobile device;
receive location information from the second mobile device using the positioning protocol;
extract, from the location information received from the second mobile device, a positioning characteristic for the second mobile device; and
combine the positioning characteristic for the second mobile device with at least part of the non-unique device-related information regarding the second mobile device.

20. The server of claim 19, wherein the processing unit is configured to cause the server to determine the positioning characteristic for the first mobile device based, at least in part, on the positioning characteristic for the second mobile device.

21. The server of claim 15, wherein the processing unit is configured to cause the server to obtain the non-unique device-related information regarding the first mobile device using Long Term Evolution (LTE) Positioning Protocol (LPP) or LPP Extensions (LPPe).

22. The server of claim 15, wherein the processing unit is configured to cause the server to communicate a request for the non-unique device-related information to the first mobile device using the positioning protocol.

23. A mobile device comprising:
a communications interface;
a memory;
a processing unit communicatively coupled with the communications interface and the memory, the processing unit configured to cause the mobile device to:
send, via the communications interface to a server, non-unique device-related information regarding the mobile device in a message, using a positioning protocol, the non-unique device-related information including comprising:
an Original Equipment Manufacturer (OEM) vendor,
an OEM model,
an OEM model version,
a chip vendor,
a chip model, or
a chip model version ID,
or any combination thereof; and
receive location support for the mobile device in accordance with the positioning protocol, wherein the location support is based at least in part on the non-unique device-related information.

24. The mobile device of claim 23, wherein the processing unit is configured to cause the mobile device to receive the location support by: receiving particular assistance data from the server using the positioning protocol, receiving a request for particular location information from the server using the positioning protocol, or sending location information to the server using the positioning protocol to enable a location estimate for the mobile device at the server based on the location information sent by the mobile device, or any combination thereof.

25. The mobile device of claim 24, wherein the processing unit is configured to cause the mobile device to utilize the particular assistance data, wherein the particular assistance data comprises a radio frequency (RF) heat map of an area, the RF heat map having one or more positioning values for each of a plurality of locations in the area.

26. The mobile device of claim 25, wherein the processing unit is configured to cause the mobile device to:
receive information regarding a reference device corresponding to the RF heat map; and
adjust the one or more positioning values for at least one location in the plurality of locations in the area based on the information regarding the reference device.

27. The mobile device of claim 23, wherein the processing unit is configured to cause the mobile device to send the non-unique device-related information regarding the mobile device using Long Term Evolution (LTE) Positioning Protocol (LPP) or LPP Extensions (LPPe).

28. The mobile device of claim 23, wherein the processing unit is configured to cause the mobile device to send the non-unique device-related information regarding the mobile device in response to a request received, via the communications interface from the server, for the non-unique device-related information regarding the mobile device.

* * * * *